United States Patent
Tian et al.

(10) Patent No.: US 9,520,800 B2
(45) Date of Patent: Dec. 13, 2016

(54) MULTILEVEL CONVERTER SYSTEMS AND METHODS WITH REDUCED COMMON MODE VOLTAGE

(71) Applicants: Kai Tian, Toronto (CA); Zhongyuan Cheng, Cambridge (CA); Bin Wu, Toronto (CA); David Dewei Xu, Pickering (CA)

(72) Inventors: Kai Tian, Toronto (CA); Zhongyuan Cheng, Cambridge (CA); Bin Wu, Toronto (CA); David Dewei Xu, Pickering (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 145 days.

(21) Appl. No.: 14/151,142

(22) Filed: Jan. 9, 2014

(65) Prior Publication Data
US 2015/0194902 A1 Jul. 9, 2015

(51) Int. Cl.
*H02M 5/458* (2006.01)
*H02M 7/483* (2007.01)
(Continued)

(52) U.S. Cl.
CPC ........... *H02M 5/458* (2013.01); *H02M 5/4585* (2013.01); *H02M 7/483* (2013.01);
(Continued)

(58) Field of Classification Search
CPC ........ H02M 5/458; H02M 7/487; H02M 5/40; H02M 5/42; H02M 5/453; H02M 5/4505; H02M 5/4585
See application file for complete search history.

(56) References Cited

U.S. PATENT DOCUMENTS

| | | |
|---|---|---|
| 4,443,841 A | 4/1984 | Mikami et al. |
| 4,783,728 A | 11/1988 | Hoffman |
| | (Continued) | |

FOREIGN PATENT DOCUMENTS

| | | |
|---|---|---|
| CN | 1190278 | 8/1998 |
| CN | 1253999 | 5/2000 |
| | (Continued) | |

OTHER PUBLICATIONS

European Search Report, EP Appl. No. 15150415.6-1809; Mailed Jun. 10, 2015; Completed May 12, 2015; The Hague; 10 pgs.
(Continued)

*Primary Examiner* — Jue Zhang
*Assistant Examiner* — Lakaisha Jackson
(74) *Attorney, Agent, or Firm* — Fay Sharpe LLP

(57) ABSTRACT

Multilevel converters and space vector modulation operating methods are presented in which fewer than all possible switching states are employed for space vector modulation of rectifier and inverter circuits to promote common mode voltage contribution cancellation or reduction therebetween and by using subsets of possible space vector modulation switching states associated with minimal positive or negative common mode voltages and in some cases using virtual vectors which have zero common mode voltages to eliminate the 3rd order harmonic components in common mode voltage as well as to reduce common mode voltage affects associated with multilevel inverter stages.

17 Claims, 17 Drawing Sheets

(51) Int. Cl.
    *H02M 7/487* (2007.01)
    *H02M 1/12* (2006.01)
    *H02M 7/5387* (2007.01)
(52) U.S. Cl.
    CPC ...... *H02M 7/487* (2013.01); *H02M 2001/123* (2013.01); *H02M 2007/53876* (2013.01)

(56) References Cited

U.S. PATENT DOCUMENTS

| | | | |
|---|---|---|---|
| 4,894,621 | A | 1/1990 | Koenig et al. |
| 5,298,848 | A | 3/1994 | Ueda et al. |
| 5,361,196 | A | 11/1994 | Tanamachi et al. |
| 5,502,633 | A | 3/1996 | Miyazaki et al. |
| 5,625,545 | A | 4/1997 | Hammond |
| 5,638,263 | A | 6/1997 | Opal et al. |
| 5,642,275 | A | 6/1997 | Peng et al. |
| 5,790,396 | A | 8/1998 | Miyazaki et al. |
| 5,933,339 | A | 8/1999 | Duba et al. |
| 5,986,909 | A | 11/1999 | Hammond et al. |
| 6,005,788 | A | 12/1999 | Lipo et al. |
| 6,031,738 | A | 2/2000 | Lipo et al. |
| 6,058,031 | A | 5/2000 | Lyons et al. |
| 6,075,350 | A | 6/2000 | Peng |
| 6,075,717 | A | 6/2000 | Kumar et al. |
| 6,101,109 | A | 8/2000 | Duba et al. |
| 6,166,929 | A | 12/2000 | Ma et al. |
| 6,222,284 | B1 | 4/2001 | Hammond et al. |
| 6,229,722 | B1 | 5/2001 | Ichikawa et al. |
| 6,236,580 | B1 | 5/2001 | Aiello et al. |
| 6,269,010 | B1 | 7/2001 | Ma et al. |
| 6,295,215 | B1 | 9/2001 | Faria et al. |
| 6,320,767 | B1 | 11/2001 | Shimoura et al. |
| 6,359,416 | B1 | 3/2002 | Rao et al. |
| 6,366,483 | B1 | 4/2002 | Ma et al. |
| 6,411,530 | B2 | 6/2002 | Hammond et al. |
| 6,469,916 | B1 | 10/2002 | Kerkman et al. |
| 6,477,067 | B1 | 11/2002 | Kerkman et al. |
| 6,541,933 | B1 | 4/2003 | Leggate et al. |
| 6,556,461 | B1 | 4/2003 | Khersonsky et al. |
| 6,617,821 | B2 | 9/2003 | Kerkman et al. |
| 6,636,012 | B2 | 10/2003 | Royak et al. |
| RE38,439 | E | 2/2004 | Czerwinski |
| 6,697,271 | B2 | 2/2004 | Corzine |
| 6,697,274 | B2 | 2/2004 | Bernet et al. |
| 6,703,809 | B2 | 3/2004 | Royak et al. |
| 6,720,748 | B1 | 4/2004 | Seibel et al. |
| 6,795,323 | B2 | 9/2004 | Tanaka et al. |
| 6,819,070 | B2 | 11/2004 | Kerkman et al. |
| 6,819,077 | B1 | 11/2004 | Seibel et al. |
| 6,842,354 | B1 | 1/2005 | Tallam et al. |
| 6,859,374 | B2 | 2/2005 | Pollanen et al. |
| 6,982,533 | B2 | 1/2006 | Seibel et al. |
| 7,034,501 | B1 | 4/2006 | Thunes et al. |
| 7,057,905 | B2 | 6/2006 | Macmillan |
| 7,068,526 | B2 | 6/2006 | Yamanaka |
| 7,106,025 | B1 | 9/2006 | Yin et al. |
| 7,164,254 | B2 | 1/2007 | Kerkman et al. |
| 7,170,767 | B2 | 1/2007 | Bixel |
| 7,180,270 | B2 * | 2/2007 | Rufer ................. H02J 3/38 290/44 |
| 7,215,559 | B2 | 5/2007 | Nondahl et al. |
| 7,274,576 | B1 | 9/2007 | Zargari et al. |
| 7,336,509 | B2 | 2/2008 | Tallam |
| 7,342,380 | B1 | 3/2008 | Kerkman et al. |
| 7,356,441 | B2 | 4/2008 | Kerkman et al. |
| 7,400,518 | B2 | 7/2008 | Yin et al. |
| 7,428,158 | B2 | 9/2008 | Bousfield, III et al. |
| 7,471,525 | B2 | 12/2008 | Suzuki et al. |
| 7,495,410 | B2 | 2/2009 | Zargari et al. |
| 7,495,938 | B2 | 2/2009 | Wu et al. |
| 7,511,976 | B2 | 3/2009 | Zargari et al. |
| 7,568,931 | B2 | 8/2009 | Hammond |
| 7,589,984 | B2 | 9/2009 | Salomaki |
| 7,649,281 | B2 | 1/2010 | Lai et al. |
| 7,800,254 | B2 | 9/2010 | Hammond |
| 7,830,681 | B2 | 11/2010 | Abolhassani et al. |
| 7,894,224 | B2 | 2/2011 | Ulrich |
| 7,978,488 | B2 | 7/2011 | Tanaka et al. |
| 8,008,923 | B2 | 8/2011 | Hammond |
| 8,040,101 | B2 | 10/2011 | Itoh et al. |
| 8,093,764 | B2 | 1/2012 | Hammond |
| 8,107,267 | B2 | 1/2012 | Tallam et al. |
| 8,130,501 | B2 | 3/2012 | Ledezma et al. |
| 8,138,697 | B2 | 3/2012 | Palma |
| 8,144,491 | B2 | 3/2012 | Bendre et al. |
| 8,159,840 | B2 | 4/2012 | Yun |
| 8,279,640 | B2 | 10/2012 | Abolhassani et al. |
| 8,400,793 | B2 | 3/2013 | Jonsson |
| 8,441,147 | B2 | 5/2013 | Hammond |
| 8,508,066 | B2 | 8/2013 | Lee et al. |
| 8,619,446 | B2 | 12/2013 | Liu et al. |
| 8,860,380 | B2 | 10/2014 | Hasler |
| 8,929,111 | B2 | 1/2015 | White |
| 2001/0048290 | A1 | 12/2001 | Underwood et al. |
| 2007/0211501 | A1 | 9/2007 | Zargari et al. |
| 2007/0297202 | A1 | 12/2007 | Zargari et al. |
| 2008/0079314 | A1 | 4/2008 | Hammond |
| 2008/0174182 | A1 | 7/2008 | Hammond |
| 2008/0180055 | A1 | 7/2008 | Zargari et al. |
| 2009/0073622 | A1 | 3/2009 | Hammond |
| 2009/0085510 | A1 | 4/2009 | Pande et al. |
| 2009/0128083 | A1 | 5/2009 | Zargari |
| 2009/0184681 | A1 | 7/2009 | Kuno |
| 2010/0025995 | A1 | 2/2010 | Lang et al. |
| 2010/0078998 | A1 | 4/2010 | Wei et al. |
| 2010/0080028 | A1 | 4/2010 | Cheng et al. |
| 2010/0091534 | A1 | 4/2010 | Tadano |
| 2010/0109585 | A1 | 5/2010 | Iwahori et al. |
| 2010/0141041 | A1 * | 6/2010 | Bose ................. H02M 7/487 307/82 |
| 2010/0301975 | A1 | 12/2010 | Hammond |
| 2011/0019449 | A1 | 1/2011 | Katoh et al. |
| 2011/0095603 | A1 | 4/2011 | Lee et al. |
| 2011/0249479 | A1 | 10/2011 | Capitaneanu et al. |
| 2012/0057380 | A1 | 3/2012 | Abe |
| 2012/0057384 | A1 | 3/2012 | Jones |
| 2012/0081932 | A1 * | 4/2012 | Videt ................. H02M 1/44 363/35 |
| 2012/0113698 | A1 | 5/2012 | Inoue |
| 2012/0195087 | A1 | 8/2012 | Kroeze et al. |
| 2012/0201056 | A1 | 8/2012 | Wei |
| 2012/0212982 | A1 | 8/2012 | Wei et al. |
| 2012/0218795 | A1 * | 8/2012 | Mihalache ............ H02M 7/487 363/97 |
| 2013/0121041 | A1 * | 5/2013 | Schroeder ............ B60L 15/007 363/37 |
| 2013/0121042 | A1 | 5/2013 | Gan et al. |
| 2013/0148390 | A1 | 6/2013 | Na |
| 2013/0223651 | A1 * | 8/2013 | Hoyerby ............. H03F 3/2173 381/120 |
| 2013/0272045 | A1 * | 10/2013 | Soeiro .................. H02M 7/537 363/131 |
| 2014/0003099 | A1 | 1/2014 | Dillig et al. |
| 2014/0063870 | A1 | 3/2014 | Bousfield, III |
| 2014/0098587 | A1 | 4/2014 | Yatsu |
| 2014/0112040 | A1 * | 4/2014 | White ................... H02M 7/487 363/123 |
| 2014/0146586 | A1 | 5/2014 | Das et al. |
| 2014/0204632 | A1 | 7/2014 | Noetzold et al. |
| 2014/0268967 | A1 | 9/2014 | White et al. |
| 2014/0293667 | A1 | 10/2014 | Schroeder et al. |
| 2015/0280608 | A1 | 10/2015 | Yoscovich et al. |

FOREIGN PATENT DOCUMENTS

| | | |
|---|---|---|
| CN | 1414692 | 4/2003 |
| CN | 2577503 | 10/2003 |
| CN | 190885 C | 2/2005 |
| CN | 1400731 A | 3/2005 |
| CN | 2737060 | 10/2005 |
| CN | 1925289 | 3/2007 |
| EP | 0874448 | 10/1998 |
| EP | 1641111 A2 | 3/2006 |

(56) References Cited

FOREIGN PATENT DOCUMENTS

| | | |
|---|---|---|
| EP | 1713168 A3 | 10/2006 |
| EP | 2378865 | 4/2012 |
| EP | 2568591 A1 | 3/2013 |
| EP | 2698912 A2 | 2/2014 |
| EP | 2838189 A2 | 2/2015 |
| GB | 1295261 A | 11/1972 |
| GB | 2345594 A | 7/2000 |
| JP | 2006223009 A | 8/2006 |
| JP | 2013102674 A | 5/2013 |
| KR | 20080061641 A | 7/2008 |
| TW | 439350 | 6/2001 |
| WO | WO2012105737 A1 | 8/2012 |

OTHER PUBLICATIONS

Abu-Rub, "Medium-Voltage Multilevel Converters-State of the Art, Challenges, and Requirements in Industrial Applications", IEEE Transactions on Industrial Electronics, vol. 57, N. 8, Aug. 2010, pp. 2581-2596.

Peng, "A Generalized Multilevel Inverter Topology with Self Voltage Balancing", IEE Transactions on Industry Applications, vol. 37, No. 2, Mar./Apr. 2001, pp. 611-618.

Choi et al., "A General Circuit Topology of Multilevel Inverter", Power Electronics Specialists Conference, 1991, PESC '92 Record., 22$^{nd}$ Annual IEEE, Jun. 24-27, 1991, 8 pgs.

Zhang et al., "A Multilevel Converter Topology with Common Flying Capacitors", IEEE, 2013, pp. 1274-1280.

Loh et al., "Reduced Common-Mode Modulation Strategies for Cascaded Multilevel Inverters"; IEEE Transactions on Industry Applications; IEEE Service Center, Piscataway, NJ; vol. 39, No. 5; Sep. 1, 2003; pp. 1386-1395.

Zhang et al., "Multilevel Inverter Modulation Schemes to Eliminate Common-Mode Voltages"; IEEE Transactions on Industry Applications; IEEE Service Center, Piscataway, NJ; vol. 36, No. 6; Nov. 1, 2000; pp. 1645-1653.

Kim et al., "A New PWM Strategy for Common-Mode Voltage Reduction in Neutral-Point-Clamped Inverter-Fed AC Motor Drives"; IEEE Transactions on Industry Applications; IEEE Service Center, Piscataway, NJ; vol. 37, No. 6; Nov. 11, 2001; pp. 1840-1845.

Celanovic et al., "A Comprehensive Study of Neutral-Point Voltage Balancing Problem in Three-Level Neutral-Point-Clamped Voltage Source PWM Inverters"; IEEE Transactions on Power Electronics, Institute of Electrical and Electronics Engineers; vol. 15, No. 2; Feb. 1, 2000, pp. 242-249.

Akagi et al., "A Passive EMI Filter for Eliminating Both Bearing Current and Ground Leakage Current From an Inverter-Driven Motor", IEEE Transactions on Power Electronics, 2006, pp. 1459-1469.

Akagi et al., "An Approach to Eliminating High-Frequency Shaft Voltage and Ground Leakage Current From an Inverter-Driven Motor", IEEE Transactions on Industry Applications, 2004, pp. 1162-1169.

Altivar 1000, "The new range of medium-voltage variable speed drives", Hi-performance compact designs from 0.5 to 10MW, Schneider Electric-Automation—Motion & Drives, Jul. 2008, 34 pgs, obtained from the World Wide Web Apr. 2013.

Angulo, Mauricio, et al., "Level-shifted PMW for Cascaded Multilevel Inverters with Even Power Distribution", IEEE Power Electronics Specialists Conference (PESC), pp. 2373-2378, Jun. 2007.

Apeldoorn et al., "A 16 MVA ANPC-PEBB with 6 ka IGCTs," in Conf. Rec. 40th IEEE IAS Annu. Meeting, Oct. 2-6, 2005, vol. 2, pp. 818-824.

Barbosa et al., "Active neutral-point-clamped multilevel converters," in Proc. IEEE 36th Power Electron. Spec. Conf., Jun. 16, 2005, pp. 2296-2301.

Bruckner et al., "The active NPC converter and its loss-balancing control," IEEE Trans. Ind. Electron., vol. 52, No. 3, pp. 855-868, Jun. 2005.

Cacciato et al., "Modified space-vector-modulation technique for common mode currents reduction and full utilization of the DC bus", in Proc. IEEE APEC Conf. Rec., 2009, pp. 109-115.

Cacciato et al., "Reduction of common mode currents in PWM inverter motor drives", IEEE Trans. Ind. Appl., vol. 35, No. 2, pp. 469â€"476, Mar./Apr. 1999.

Cavalcanti et al., "Modulation Techniques to Eliminate Leakage Currents in Transformerless Three-Phase Photovoltaic Systems", IEEE Transactions on Industrial Electronics, 2010, pp. 1360-1368.

Cengelci, E., et al., *A New Medium Voltage PWM Inverter Topology for Adiustable Speed Drives*, IEEE, 0-7803-4943-1, 1998, pp. 1416-1423.

Cha, Han Ju et al. An Approach to Reduce Common-Mode Voltage in Matrix Converter, Jul./Aug. 2003, IEEE, vol. 39, pp. 1151-1159.

Cha, Han Ju, "Analysis and Design of Matrix Converter for Adjustable Speed Drive and Distributed Power Sources", Aug. 2004, Texas A&M Univ., Doctor of Philosophy Dissertation Paper.

Chaudhuri, Toufann, et al., *Introducing the Common Cross Connected Stage ($C^3S$) for the 5L ANPC Multilevel Inverter*, IEEE, 978-1-4244-1668-4, 2008, pp. 167-173.

Cheng et al., "A novel switching sequence design for five-level NPC/H-bridge inverters with improved output voltage spectrum and minimized device switching frequency," IEEE Trans. Power Electron., vol. 22, No. 6, pp. 2138-2145, Nov. 2007.

De Broe, et al., "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.

Erdman, Russel J. Kerkman, David W. Schlegel, and Gary L. Skibinski, "Effect of PWM Inverters on AC Motor Bearing Currents and Shaft Voltages", 1996 IEEE.

Etxeberria-Otadui et al., Gaztaaga, U. Viscarret, and M. Caballero, "Analysis of a H-NPC topology for an AC traction front-end converter," in Proc. 13th EPE-PEMC, Sep. 1-3, 2008, pp. 1555-1561.

Floricau, Dan et al., *A new stacked NPC converter: 3L-topology and control*, Proceedings of the 12$^{th}$ European Conf. on Power Electronics and Applications, EPE 2007, EPE Association, 2007, 10 pgs.

Glinka, M., *Prototype of Multiphase Modular-Multilevel-Converter with 2 MW power rating and 17-level-output-voltage*, IEEE, 0-7803-8399-0, 2004, pp. 2572-2576.

Guennegues et al., "Selective harmonic elimination PWM applied to H-bridge topology in high speed applications," in Proc. Int. Conf. POWERENG, Mar. 18-20, 2009, pp. 152-156.

Guennegues, V., et al., *A Converter Topology for High Speed Motor Drive Applications*, IEEE Xplore, 2009, 8 pgs.

Gupta et al., "A Space Vector Modulation Scheme to Reduce Common Mode Voltage for Cascaded Multilevel Inverters", IEEE Transactions on Power Electronics, vol. 22, No. 5, Sep. 2007, pp. 1672-1681.

Hava et al., "A high-performance PWM algorithm for common-mode voltage reduction in three-phase voltage source inverters," IEEE Trans. Power Electron., vol. 26, No. 7, pp. 1998-2008, Jul. 2011.

Hiller, Mark et al., *Medium-Voltage Drives; An overview of the common converter topologies and power semiconductor devices*, IEEE Industry Applications Magazine, Mar.-Apr. 2010, pp. 22-30.

Horvath, "How isolation transformers in MV drives protect motor insulation", TM GE Automation Systems, Roanoke, VA, 2004.

Hua, Lin, "A Modulation Strategy to Reduce Common-Mode Voltage for Current-Controlled Matrix Converters", Nov. 2006, IEEE Xplore, pp. 2775-2780.

Iman-Eini, Hossein et al., "A Fault-Tolerant Control Strategy for Cascaded H-Bridge Multilevel Rectifiers", Journal of Power Electronics, vol. 1, Jan. 2010.

Kerkman, et al., "PWM Inverters and Their Influence on Motor Over-Voltage," 1997 IEEE.

Khomfoi, Surin et al., "Fault Detection and Reconfiguration Technique for Cascaded H-bridge 11-level Inverter Drives Operating under Faulty Condition", 2007 IEEE, PEDS 2007, pp. 1035-1042.

Kleferndorf et al., "A new medium voltage drive system based on anpc-5I technology," in Proc. IEEE-ICIT, Viña del Mar, Chile, Mar. 2010, pp. 605-611.

(56) References Cited

OTHER PUBLICATIONS

Kouro et al., "Recent advances and industrial applications of multilevel converters," IEEE Trans. Ind. Electron., vol. 57, No. 8, pp. 2553-2580, Aug. 2010.

Kouro, Samir, et al., *Recent Advances and Industrial Applications of Multilevel Converters*, IEEE Transactions on Industrial Electronics, vol. 57, No. 8, Aug. 2010, pp. 2553-2580.

Lai et al., "Optimal common-mode voltage reduction PWM technique for inverter control with consideration of the dead-time effects-part I: basic development," IEEE Trans. Ind. Appl., vol. 40, No. 6, pp. 1605-1612, Nov./Dec., 2004.

Lai et al., "Optimal Common-Mode Voltage Reduction PWM Technique for Inverter Control with Consideration of the Dead-Time Effects-Part 1: Basic Development", 2004 IEEE.

Lee, Hyeoun-Dong et al., "A Common Mode Voltage Reduction in Boost Rectifier/Inverter System by Shifting Active Voltage Vector in a Control Period", IEEE Transactions on Power Electronics, vol. 15, No. 6, Nov. 2000.

Lesnicar et al., "An Innovative Modular Multilevel Converter Topology Suitable for a Wide Power Range", 2003 IEEE Bologna PowerTech Conference, Jun. 23-26, Bologna Italy, 6 pgs.

Lesnicar, A., et al., *A new modular voltage source inverter topology*, Inst. of Power Electronics and Control, Muenchen, DE, Oct. 10, 2007, pp. 1-10.

Lezana, Pablo et al., "Survey on Fault Operation on Multilevel Inverters", IEEE Transactions on Industrial Electronics, vol. 57, No. 7, Jul. 2010, pp. 2207-2217.

Li, Jun, et al., *A New Nine-Level Active NPC (ANPC) Converter for Grid Connection of Large Wind Turboines for Distributed Generation*, IEEE Transactions on Power Electronics, vol. 26, No. 3, Mar. 2011, pp. 961-972.

McGrath, Brendan Peter et al., "Multicarrier PMW Strategies for Multilevel Inverters," IEEE Transactions on Industrial Electronics, vol. 49, No. 4, pp. 858-867, Aug. 2002.

Meili et al., "Optimized pulse patterns for the 5-level ANPC converter for high speed high power applications," in Proc. 32nd IEEE IECON, Nov. 6-10, 2006, pp. 2587-2592.

Muetze & A. Binder, "Don't lose Your Bearings", Mitigation techniques for bearing currents in inverter-supplied drive systems, 2006 IEEE.

Naik et al., "Circuit model for shaft voltage prediction in induction motors fed by PWMbased AC drives", IEEE Trans. Ind. Appl., vol. 39, No. 5, pp. 1294-1299, Nov./Dec. 1996.

O-Harvest, product information, Beijing Leader & Harvest Electric Technologies Co., Ltd., http:/www.ld-harvest.com/en/3-1-2.htm, retrieved from the Internet Apr. 11, 2013, 3 pgs.

Park, Young-Min, "A Simple and Reliable PWM Synchronization & Phase-Shift Method for Cascaded H-Bridge Multilevel Inverters based on a Standard Serial Communication Protocol", IEEE 41$^{st}$ IAS Annual Meeting, pp. 988-994, Oct. 2006.

Rashidi-Rad et al., "Reduction of Common-Mode Voltage in an Even Level Inverter by a New SVM Method", Int'l Journal of Advanced Computer Science, vol. 2, No. 9, pp. 343-347, Sep. 2012.

Rendusara, et al., "Analysis of common mode voltage-'neutral shift' in medium voltage PWM adjustable speed drive (MV-ASD) systems", IEEE Trans. Power Electron., vol. 15, No. 6, pp. 1124-1133, Nov. 2000.

Robicon Perfect Harmony, "Medium-Voltage Liquid-Cooled Drives", Siemens, Catalog D 15.1, 2012, USA Edition, obtained from the World Wide Web Apr. 2013, 91 pgs. (Downloaded to EFS Web as Part 1, pp. 1-49; and Part 2, pp. 50-91).

Robicon Perfect Harmony, "The Drive of Choice for Highest Demands", Siemens, Copyright Siemens AG 2008, 16 pgs, .obtained from the World Wide Web Apr. 2013.

Robicon, "Perfect Harmony MV Drive Product Overview", 18 pgs . . . obtained from the World Wide Web Apr. 2013.

Rodriguez et al., "A New Modulation Method to Reduce Common-Mode Voltages in Multilevel Inverters", IEEE Transactions on Industrial Electronics, vol. 51, No. 4, Aug. 2004, 834-939.

Rodriguez et al., "Multilevel inverters: A survey of topologies, controls, and applications," IEEE Trans. Ind. Electron., vol. 49, No. 4, pp. 724-738, Aug. 2002.

Rodriguez et al., "Operation of a Medium-Voltage Drive Under Faulty Conditions", IEEE Transactions on Industrial Electronics, vol. 52, No. 4, Aug. 2005, pp. 1080-1085.

Rodriguez, et al., "Multilevel voltage source-converter topologies for industrial medium-voltage drives," IEEE Trans. Ind. Electron., vol. 54, No. 6, pp. 2930-2945, Dec. 2007.

Saeedifard, et al., "Operation and control of a hybrid seven-level converter," IEEE Trans. Power Electron., vol. 27, No. 2, pp. 652-660, Feb. 2012.

Saeedifard, Maryann et al., *Analysis and Control of DC-Capacitor-Voltage-Drift Phenomenon of a Passive Front-End Five-Level Converter*, IEEE Transactions on Industrial Electronics, vol. 54, No. 6, Dec. 2007, pp. 3255-3266.

Sedghi, S. et al., "A New Multilevel Carrier Based Pulse Width Modulation Method for Modular Multilevel Inverter", IEEE, 8$^{th}$ International Conference on Power Electronics—ECCE Asia (ICPE & ECCE), pp. 1432-1439, May 30-Jun. 3, 2011.

Sepahvand, Hossein et al., "Fault Recovery Strategy for Hybrid Cascaded H-Bridge Multi-Level Inverters", 2011 IEEE, pp. 1629-1633.

Serpa et al., "Fivelevel virtual-flux direct power control for the active neutral-point clamped multilevel inverter," in Proc. IEEE Power Electron. Spec. Conf.

Serpa, L.A. et al., *Five-Level Virtual-Flux Direct Power Control for the Active Neutral-Point Clamped Multilevel Inverter*, IEEE, 978-1-4244-1668-4, 2008, pp. 1668-1674.

Silva, Cesar et al., *Control of an Hybrid Multilevel Inverter for Current Waveform Improvement*, IEEE, 978-1-4244-1666-0, 2008, pp. 2329-2335.

Song, Wenchao et al., "Control Strategy for Fault-Tolerant Cascaded Multilevel Converter based STATCOM", 2007 IEEE, pp. 1073-1076.

Ulrich, James A., et al., *Floating Capacitor Voltage Regulation in Diode Clamped Hybrid Multilevel Converters*, IEEE, 978-1-4244-3439-8, 2009, pp. 197-202.

Un et al., "A near-state PWM method with reduced switching losses and reduced common-mode voltage for three-phase voltage source inverters," IEEE Trans. Ind. Appl., vol. 45, No. 2, pp. 782-793, Mar./Apr., 2009.

Un et al., "A Near State PWM Method With Reduced Switching Frequency and Reduced Common Mode Voltage for Three-Phase Voltage Source Inverters", 2007 IEEE.

Wang, "Motor shaft voltages and bearing currents and their reduction in multilevel medium-voltage PWM voltage-source-inverter drive applications", IEEE Trans. Ind. Appl., vol. 36, No. 5, pp. 1336-1341, Sep./Oct. 2000.

Wei, Sanmin et al., "Control Method for Cascaded H-Bridge Multilevel Inverter with Faulty Power Cells", 2003 IEEE, pp. 261-267.

Wen, Jun et al., *Synthesis of Multilevel Converters Based on Single-and/or Three-Phase Converter Building Blocks*, IEEE Transactions on Power Electronics, vol. 23, No. 3, May 2008, pp. 1247-1256.

Wu et al., "A five-level neutral-point-clamped H-bridge PWM inverter with superior harmonics suppression: A theoretical analysis," in Proc. IEEE Int. Symp. Circuits Syst., Orlando, FL, May 30-Jun. 2, 1999, vol. 5, pp. 198-201.

Wu, Bin, "EE8407 Power Converter Systems", Topic 6, Multilevel Cascaded H-Bridge (CHB) Inverters, pp. 1-14, 2006.

Wu, Bin, "High-Power Converters and AC Drives", Wiley-IEEE Press, 2006, Chapter 7, pp. 119-142.

Wu, Bin, "High-Power Converters and AC Drives", Wiley-IEEE Press, 2006, Chapter 9, pp. 179-186.

Wu, High-Power Converters and AC Drives. New York/Piscataway, NJ: Wiley/IEEE Press, 2006, Ch. 1.

Yantra Harvest Energy Pvt. Ltd., "Medium Voltage Drives", www.yantraharvest.com, obtained from the World Wide Web Apr. 2013.

Yin, et al., "Analytical Investigation of the Switching Frequency Harmonic Characteristic for Common Mode Reduction Modulator", 2005 IEEE.

(56) References Cited

OTHER PUBLICATIONS

Zhao, et al., "Hybrid Selective Harmonic Elimination PWM for Common-Mode Voltage Reduction in Three-Level Neutral-Point-Clamped Inverters for Variable Speed Induction Drives", IEEE Transactions on Power Electronics, 2012, pp. 1152-1158.

Zhao, Jing et al., "A Novel PWM Control Method for Hybrid-Clamped Multilevel Inverters", IEEE Transactions on Industrial Electronics, vol. 57, No. 7, pp. 2365-2373, Jul. 2010.

Zhu et al., An Integrated AC Choke Design for Common-Mode Current Suppression in Neutral-Connected Power Converter Systems. IEEE Transactions on Power Electronics, 2012, pp. 1228-1236.

Ghias et al., "Performance Evaluation of a Five-Level Flying Capacitor Converter With Redcued DC Bus Capacitance Under Two Different Modulation Schemes"; Power Electronics for Distributed Generation Systems (PEDG); 2012 $3^{rd}$ IEEE Int'l Symposium, IEEE, Jun. 25, 2012; pp. 857-864.

Ghias et al., "Voltage Balancing Strategy for a Five-Level Flying Capacitor Converter Using Phase Disposition PWM With Sawtooth-Shaped Carriers";IECON 2012-$38^{th}$ Annual Conf., IEEE Industrial Electronics Society; Oct. 25, 2012; pp. 5013-5019.

Maia et al., "Associating PWM and Balancing Techniques for Performance Improvement of Flying Capacitor Inverter"; 2013 Brazilian Power Electronics Conf., IEEE; Oct. 27, 2013; pp. 92-99.

\* cited by examiner

| # | Levels | Vcm | # | Levels | Vcm | # | Levels | Vcm | # | Levels | Vcm |
|---|---|---|---|---|---|---|---|---|---|---|---|
| 1 | 000(0) | $-V_{DC}/2$ | 17 | 201(3) | $-V_{DC}/6$ | 33 | 221(5) | $+V_{DC}/18$ | 49 | 123(6) | $+V_{DC}/6$ |
| 2 | 100(1) | $-7V_{DC}/18$ | 18 | 300(3) | $-V_{DC}/6$ | 34 | 122(5) | $+V_{DC}/18$ | 50 | 213(6) | $+V_{DC}/6$ |
| 3 | 010(1) | $-7V_{DC}/18$ | 19 | 030(3) | $-V_{DC}/6$ | 35 | 212(5) | $+V_{DC}/18$ | 51 | 312(6) | $+V_{DC}/6$ |
| 4 | 001(1) | $-7V_{DC}/18$ | 20 | 003(3) | $-V_{DC}/6$ | 36 | 311(5) | $+V_{DC}/18$ | 52 | 330(6) | $+V_{DC}/6$ |
| 5 | 110(2) | $-5V_{DC}/18$ | 21 | 211(4) | $-V_{DC}/18$ | 37 | 131(5) | $+V_{DC}/18$ | 53 | 033(6) | $+V_{DC}/6$ |
| 6 | 101(2) | $-5V_{DC}/18$ | 22 | 121(4) | $-V_{DC}/18$ | 38 | 113(5) | $+V_{DC}/18$ | 54 | 303(6) | $+V_{DC}/6$ |
| 7 | 011(2) | $-5V_{DC}/18$ | 23 | 112(4) | $-V_{DC}/18$ | 39 | 320(5) | $+V_{DC}/18$ | 55 | 331(7) | $+5V_{DC}/18$ |
| 8 | 200(2) | $-5V_{DC}/18$ | 24 | 220(4) | $-V_{DC}/18$ | 40 | 230(5) | $+V_{DC}/18$ | 56 | 133(7) | $+5V_{DC}/18$ |
| 9 | 020(2) | $-5V_{DC}/18$ | 25 | 022(4) | $-V_{DC}/18$ | 41 | 032(5) | $+V_{DC}/18$ | 57 | 313(7) | $+5V_{DC}/18$ |
| 10 | 002(2) | $-5V_{DC}/18$ | 26 | 202(4) | $-V_{DC}/18$ | 42 | 023(5) | $+V_{DC}/18$ | 58 | 322(7) | $+5V_{DC}/18$ |
| 11 | 111(3) | $-V_{DC}/6$ | 27 | 310(4) | $-V_{DC}/18$ | 43 | 203(5) | $+V_{DC}/18$ | 59 | 232(7) | $+5V_{DC}/18$ |
| 12 | 210(3) | $-V_{DC}/6$ | 28 | 130(4) | $-V_{DC}/18$ | 44 | 302(5) | $+V_{DC}/18$ | 60 | 223(7) | $+5V_{DC}/18$ |
| 13 | 120(3) | $-V_{DC}/6$ | 29 | 031(4) | $-V_{DC}/18$ | 45 | 222(6) | $+V_{DC}/6$ | 61 | 332(8) | $+7V_{DC}/18$ |
| 14 | 021(3) | $-V_{DC}/6$ | 30 | 013(4) | $-V_{DC}/18$ | 46 | 321(6) | $+V_{DC}/6$ | 62 | 233(8) | $+7V_{DC}/18$ |
| 15 | 012(3) | $-V_{DC}/6$ | 31 | 103(4) | $-V_{DC}/18$ | 47 | 231(6) | $+V_{DC}/6$ | 63 | 323(8) | $+7V_{DC}/18$ |
| 16 | 102(3) | $-V_{DC}/6$ | 32 | 301(4) | $-V_{DC}/18$ | 48 | 132(6) | $+V_{DC}/6$ | 64 | 333(9) | $+V_{DC}/2$ |

FIG. 8

| CASE | MODULATION INDEX | RECTIFIER MODULATION | INVERTER MODULATION |
|---|---|---|---|
| 1 | $0 \leq m_{ra} \leq 0.7698$<br>$0 \leq m_{ia} \leq 0.7698$ | Type A (Vcm = +V$_{DC}$/18) | Type A (Vcm = +V$_{DC}$/18) |
| 1 | $0 \leq m_{ra} \leq 0.7698$<br>$0 \leq m_{ia} \leq 0.7698$ | Type B (Vcm = -V$_{DC}$/18) | Type B (Vcm = -V$_{DC}$/18) |
| 2 | $0 \leq m_{ra} \leq 0.7698$<br>$0.7698 \leq m_{ra} \leq 0.8889$ | Same as Inverter | Type A or B (Vcm = +/-V$_{DC}$/18) |
| 3 | $0.7698 \leq m_{ra} \leq 0.8889$<br>$0 \leq m_{ia} \leq 0.7698$ | Type A or B (Vcm = +/-V$_{DC}$/18) | Same as Rectifier |

FIG. 12

| TYPE | | SEQUENCE | # SWITCHINGS |
|---|---|---|---|
| Type A | 7-segment | 211-221-121-122-121-221-211 | 6 |
| Type B | 5-segment | 211-221-121-221-211 | 4 |

| TYPE | SEQUENCE | # SWITCHINGS |
|---|---|---|
| 5-segment | 310-311-301-311-310 | 4 |
| 5-segment | 301-311-310-311-301 | 4 |
| 5-segment | 311-310-311-301-311 | 4 |

MULTILEVEL CONVERTER SYSTEMS AND METHODS WITH REDUCED COMMON MODE VOLTAGE

BACKGROUND

Multilevel converters can be used for rectifying AC to produce DC, and may also be employed to generate AC output voltages for use in motor drives or other power conversion systems. This modular form of converter finds particular use in situations where relatively large output voltages are required. Multilevel voltage source converter architectures include flying or switched capacitor designs, neutral point clamped (NPC) designs, modular multilevel converter (MMC), as well as cascaded and hybrid typologies. NPC designs include a pair of capacitors connected across a DC input providing a neutral node, with each capacitor being charged to half the DC input value, and a series of switches are connected across the DC bus, with a pair of diodes connecting intermediate switch nodes to the neutral point. These and other forms of multilevel converters may be operated using space vector modulation techniques to generate switching control signals applied to the individual multilevel converters stages, for example, to provide variable frequency, variable amplitude multiphase output voltages to drive a motor or other load. Typical space vector modulation approaches utilize all or most of the available output power that can be provided by the inverter circuit, but use of all the possible switching states in the typical space vector modulation scheme may lead to unacceptable common mode voltage in the power conversion system. Accordingly, a need remains for improved space vector modulation control of multilevel power converters to facilitate reduction in common mode voltages.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter.

The present disclosure provides multilevel converter systems and operating techniques by which system common mode voltages and the associated problems can be mitigated in motor drives and other power conversion system applications. Various techniques are disclosed for operating so-called back to back multilevel converters constituting a multiphase active rectifier coupled through an intermediate DC bus circuit to a multiphase multilevel inverter circuit in which space vector modulation of the multilevel converters of the rectifier and of the inverter are controlled in a manner that facilitates complete or at least partial cancellation of the respective common mode voltage contributions of the rectifier and inverter. In addition, space vector modulation techniques are disclosed for operating multilevel inverter systems, whether coupled with an active rectifier or other DC input source, in which only a subset of possible switching states is employed for generating switching control signals, where the selected switching states are those for which a common mode voltage contribution of the multilevel stage is a minimal value, positive or negative. By these techniques, the applicability of multilevel converters of a variety of forms is enhanced with respect to common mode voltage issues, while retaining the other cost, performance, and low complexity advantages of multilevel conversion stage architectures.

In accordance with one or more aspects of the present disclosure, a power conversion system is disclosed, with an active rectifier having two or more multilevel rectifier converter stages along with a DC bus circuit and an inverter which includes a plurality of multilevel inverter stages. The system further includes a controller that provides rectifier and inverter switching control signals to facilitate offsetting or cancellation of the common mode voltage contributions of the rectifier and the inverter. The rectifier and inverter and the system can be constructed using any suitable multilevel converter stage topology, including without limitation nested neutral point clamped converters, neutral point clamped converters, flying capacitor converter stages, cascaded H bridge circuits, modular multilevel converter, etc. and various switched capacitor implementations, such as nested neutral point converters having charge capacitors used for generating multilevel signals. The rectifier and inverter can be operated using unsynchronized modulation, and may be operated at different switching frequencies, and each provide constant common mode voltage contributions, with the controller providing for offsetting or cancellation of the individual common mode voltage contributions. The controller may provide the rectifier and inverter switching control signals to regulate the switched capacitor voltages by controlling the switched capacitor charging and discharging, for example, through selection of redundant output states for one or more levels associated with the multilevel converter stages to regulate the voltages across the converter stage capacitors.

The system may employ multilevel converters of any suitable number of associated levels in various embodiments. In certain embodiments, moreover, the controller selectively employs the same subset of possible space vector modulation switching states for space vector modulation control of both the rectifier and the inverter when the modulation indices of both rectifier and inverter are below a predetermined value, where one possible subset includes switching states for which the associated common mode voltage contribution is a minimal positive value, and a second possible subset includes states for which the common mode voltage contribution is a minimal negative value. By this technique, complete or at least partial common mode voltage contribution cancellation is facilitated. For higher modulation index operation of either the rectifier or inverter, certain embodiments of the controller employ both these subsets for space vector modulation of the rectifier and the inverter, thereby providing control of common mode voltage issues while still attaining more complete utilization of the rated output capabilities of the power conversion system.

Methods are provided in accordance with further aspects of the disclosure for operating a multiphase AC-AC conversion system having active rectifier and inverter circuits constructed using a plurality of multilevel converter stages, including providing switching control signals to the multilevel stages of the rectifier and the inverter to facilitate offsetting of common mode voltage contributions thereof. The method may further comprise providing the switching control signals according to corresponding rectifier and inverter reference vectors based on a corresponding subset of possible switching states for which the common mode voltage contribution of the corresponding converter stage is minimal. The method may further comprise providing the switching control signals to corresponding rectifier and inverter stages based on created virtual space vectors for which the average common mode voltage contribution of the converter stage is zero, thereby facilitating elimination of low order harmonic components in common mode voltage.

In accordance with further aspects of the disclosure, power converters and operating methods are disclosed in which a multiphase multilevel converter is provided with a plurality of multilevel converter stages, and a controller provides switching control signals to the individual stages via space vector modulation using only a subset of possible switching states or with their special combinations for which the associated common mode voltage contribution is a minimal positive or negative value, or the average common mode voltage contribution of the associated combinations is zero.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 8 is a table illustrating system common mode voltages associated with the possible NNPC module output levels in the space vector modulation diagram of FIG. 6 for the three-phase power conversion system of FIG. 3;

FIG. 12 illustrates a table showing different types of operation of the rectifier and inverter (type A or type B) for reducing common mode voltage levels in the system FIG. 3 in accordance with one or more aspects of the present disclosure;

DETAILED DESCRIPTION

Figure 1:
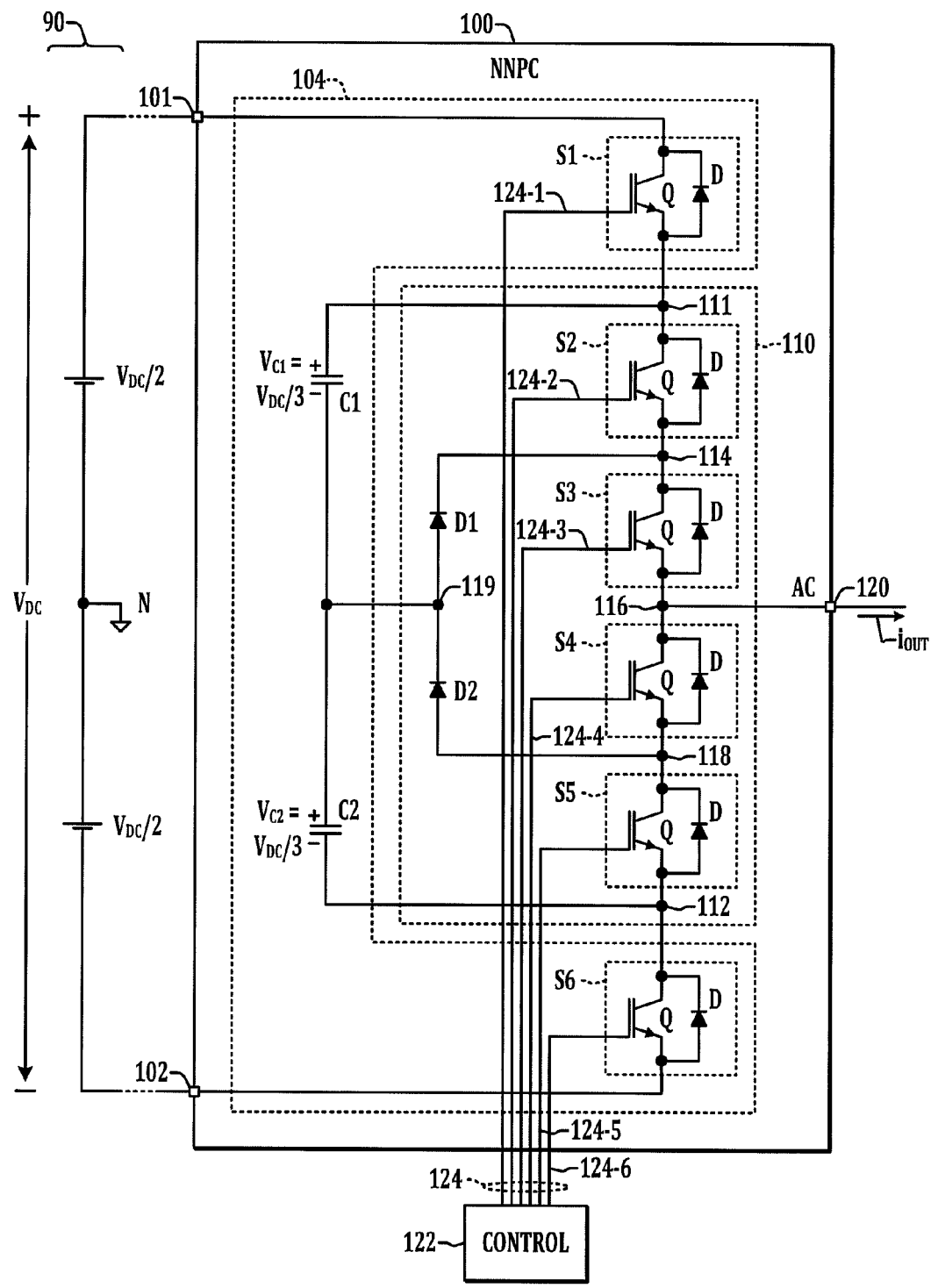
FIG. 1 is a schematic diagram illustrating an exemplary nested neutral point clamped (NNPC) multilevel power converter including an inverter circuit and a switched capacitor circuit with a controller using redundant switch state selection to control charging and discharging of first and second flying capacitors to provide multilevel output voltage while controlling common mode voltages and to regulate the flying capacitor voltages in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

Space vector modulation (SVM) operating processes and power converter apparatus are disclosed hereinafter in the context of nested neutral point clamped (NNPC) multilevel converter stages 100, although the various aspects and concepts of the present disclosure may be employed in other forms and types of multilevel converter stages amenable to space vector modulation, including without limitation switched capacitor multilevel converters, cascaded multilevel converters such as cascaded H Bridges (CHBs), neutral point clamped (NPC) multilevel converter stages, modular multilevel converter (MMC), NNPC stages, and the like.

Referring initially to FIG. 1, an exemplary four-level NNPC converter stage 100 is shown, which can be combined with other such stages 100 to form a multiphase multi-level power conversion system in accordance with one or more aspects of the present disclosure. The described nested NPC power converters 100 may be used to form single or multiphase power supplies for driving any type of load, and the described power converters and power conversion systems may be employed in motor drives, although various concepts of the present disclosure are not limited to any specific applications, and can be employed in any form of power conversion system driving any type of load. Moreover, the multilevel stages 100 can be used to form an inverter for DC-AC conversion, such as an output stage of a motor drive, and/or the stages 100 may be used to form a multilevel rectifier circuit to convert received single or multiphase AC input power to provide DC output power. As seen in FIG. 1, the converter stage 100 has first and second DC terminals 101 and 102, respectively, which are inputs in the case of an inverter application, as well as an AC terminal 120 which in the case of an inverter application provides a single-phase AC output voltage and associated output current $i_{OUT}$ to drive a load (not shown).

The stage 100 of FIG. 1 is referred to herein as a nested neutral point clamped (NNPC) power converter, and includes a switched capacitor (e.g., flying capacitor) circuit 104 nesting an NPC type inverter circuit 110. Examples of NNPC multilevel converters are shown and described in U.S. patent application Ser. No. 13/922,401, filed Jun. 20, 2013, entitled MULTILEVEL VOLTAGE SOURCE CONVERTERS AND SYSTEMS and assigned to the assignee of the present application, the entirety of which is hereby incorporated by reference. Although referred to herein as an NNPC power converter, the center node 119 of the NPC type inverter circuit 110 need not be connected to any system "neutral". The converter 100 receives DC input electrical power from a source 90 via the DC terminals 101 and 102, where FIG. 1 illustrates an exemplary input configuration including two series-connected batteries, each having a voltage value of $V_{DC}/2$ with the power converter 100 thus being provided with a DC input voltage having a value $V_{DC}$. In addition, although not a strict requirement of all implementations of the power converter 100, the configuration shown in FIG. 1 includes a neutral node "N" connected to the connection point of the two batteries of the DC input source 90. Any suitable DC source 90 can be used in connection with the power converter 100 when employed as an inverter stage, including without limitation one or more batteries, active and/or passive rectifiers, etc. Moreover, the DC source 90 may include DC bus capacitances, whether a single capacitor or any combination of multiple capacitors connected in any series and/or parallel configuration. In addition, certain embodiments of the NNPC converter stage 100 may include one or more on-board capacitances connected between the DC input terminals 101 and 102.

The converter stage 100 includes an inverter circuit 110 with switching devices S2-S5 connected in series with one another between first and second inverter circuit input nodes 111 and 112, as well as an inverter output node 116 connecting two of the inverter switching devices S3 and S4, where the inverter output node 116 is connected directly or indirectly to the AC output terminal 120 of the converter 100. The inverter circuit 110, moreover, can include any integer number of switching devices S connected in series with one another between the nodes 111 and 112. In the illustrated example, four devices S2-S5 are provided, with the output node 116 having two switching devices S2 and S3 between the output 116 and the upper input node 111, and two switches S4 and S5 connected between the output node 116 and the second inverter input node 112. In addition, the switched capacitor circuit 104 includes additional switches S1 and S6 connected as shown between the inverter inputs 111 and 112 and the corresponding DC input terminals 101 and 102. Any suitable type of switching devices S1-S6 may be used in the circuits 104 and 110 of the power stage 100, including without limitation semiconductor-based switches such as insulated gate bipolar transistors (IGBTs), silicon controlled rectifiers (SCRs), gate turn-off thyristors (GTOs), integrated gate commutated thyristors (IGCTs), etc. Moreover, as illustrated in FIG. 1, the individual switches S1-S6 include diodes for conducting current in reverse directions when the switch is off, although not a strict requirement of all embodiments.

The inverter circuit 110 also includes a clamping circuit having first and second clamping elements, such as diodes D1 and D2 connected in series with one another, with the cathode of D1 connected to a first internal node 114, and the anode of D2 connected to a second internal node 118. The cathode of D2 is joined to the anode of D1 at a third internal node 119. D1 provides a conductive path from the third internal node 119 to the first internal node 114, and D2 provides a conductive path from the second internal node 118 to the third internal node 119. Active clamping switches or other clamping elements can be used in other embodiments instead of clamping diodes as shown in the drawings. Other configurations are possible in which diodes or other clamping elements are connected in series with one another between first and second internal nodes of the inverter switching circuit. Further, single diodes D1 and D2 may be used as shown, or multiple diodes or other clamping elements may be used. For example, D1 can be replaced with two or more diodes in any suitable series and/or parallel configuration between the nodes 119 and 114, and D2 may be replaced with two or more diodes interconnected in any suitable fashion between the nodes 118 and 119. Furthermore, the diodes D1 and D2 and/or the clamping diodes across the switching devices S1-S6 of the NNPC converters 100 can alternatively be clamping switches (not shown). The clamping diodes D1 and D2 can also be replaced by active switches to achieve active neutral point clamping.

The switched capacitor circuit 104 includes switches S1 and S6 connected between the prospective DC input terminals 101 and 102 and a corresponding one of the nodes 111 and 112. In addition, the switched capacitor circuit 104 includes first and second capacitors C1 and C2 individually connected between the third internal node 119 and the corresponding inverter circuit input nodes 111 and 112 as shown. Any suitable type and configuration of capacitors C1 and C2 can be used, where the individual capacitors C1 and C2 can be a single capacitor or multiple capacitors connected in any suitable series and/or parallel configuration to provide a first capacitance C1 between the nodes 111 and 119 as well as a second capacitance C2 between the nodes 119 and 112. Moreover, C1 and C2 are preferably of substantially equal capacitance values, although not a strict requirement of the present disclosure.

Referring also to FIGS. 2-5, a controller 122 provides switching control signals 124-2, 124-3, 124-4 and 124-5 to the respective inverter switching devices S2-S5 and provides switching control signals 124-1 and 124-6 to the switched capacitor circuit switching devices S1 and S6 to generate one of four possible distinct output voltage levels when the converter 100 is operated as an inverter. If the clamping devices D1 and D2 are active devices, controller 122 also provides switching control signals to active clamping devices D1 and D2. Controller 122 in certain embodiments may also receive feedback signals such as voltages and/or currents which are not shown in the figures. The controller 122 can be implemented as part of the converter 100 and/or may be a separate component or system, and a single controller 122 may provide signals 124 to multiple converter stages 100 to implement the space vector modulation techniques for common mode reduction as described further below. The converter controller 122 can be implemented using any suitable hardware, processor executed software or firmware, programmable logic or combinations thereof, wherein an exemplary embodiment of the controller 122 includes one or more processing elements such as microprocessors, microcontrollers, FPGAs, DSPs, programmable logic, etc., along with electronic memory, program memory and signal conditioning driver circuitry, with the processing element(s) programmed or otherwise configured to generate the inverter switching control signals 124 suitable for operating the switching devices of the power stages 100, as well as to perform other operational tasks to drive a load. Moreover, computer readable mediums are contemplated with computer executable instructions for implementing the described power converter switching control processes and techniques, which may be stored as program instructions in an electronic memory forming a part of, or otherwise operatively associated with, the controller 122.

Figure 2:
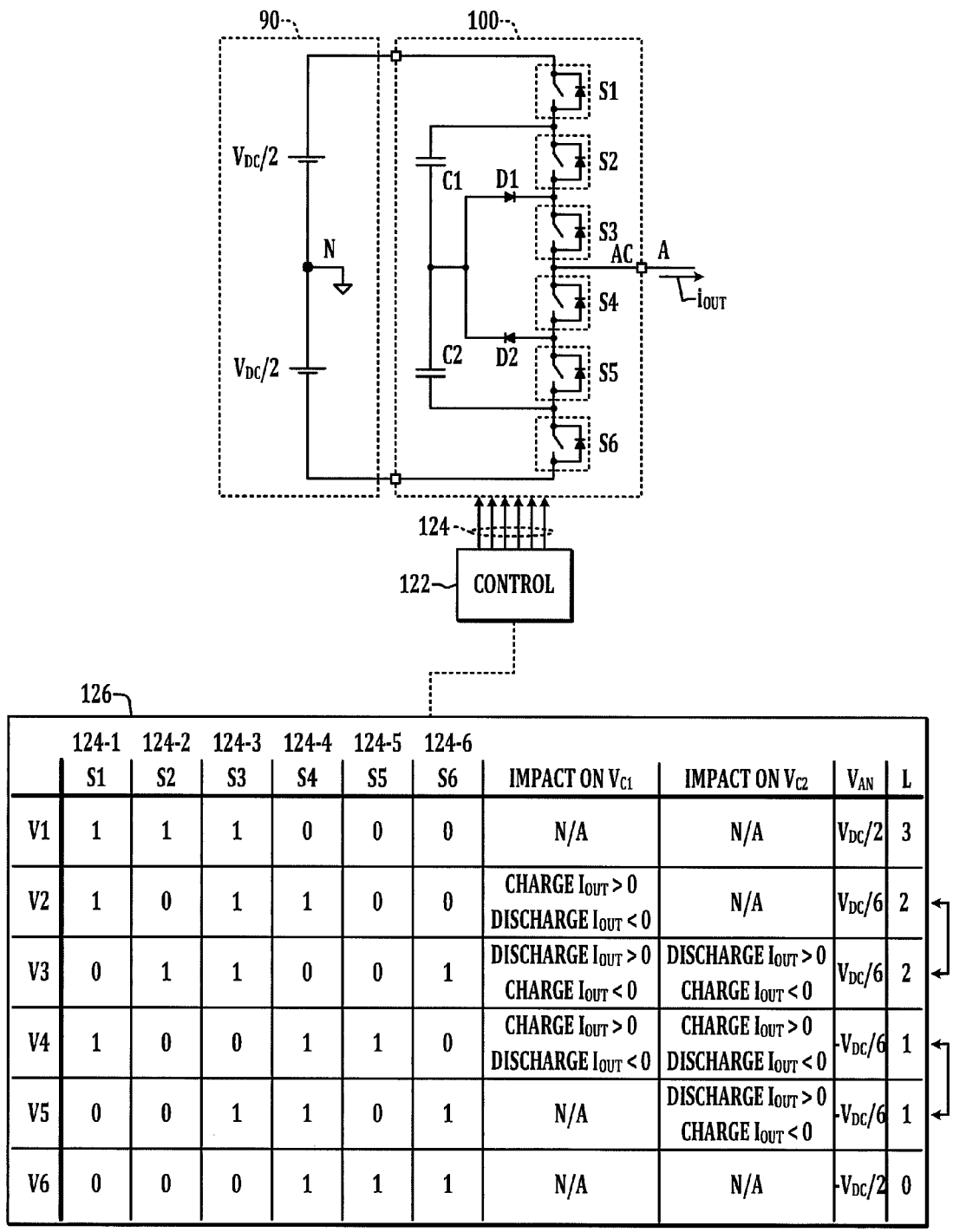
FIG. 2 is a partial schematic diagram illustrating an exemplary set of switching states for the NNPC power converter of FIG. 1 to provide a four-level voltage output with substantially equally spaced steps.
Figure 3:
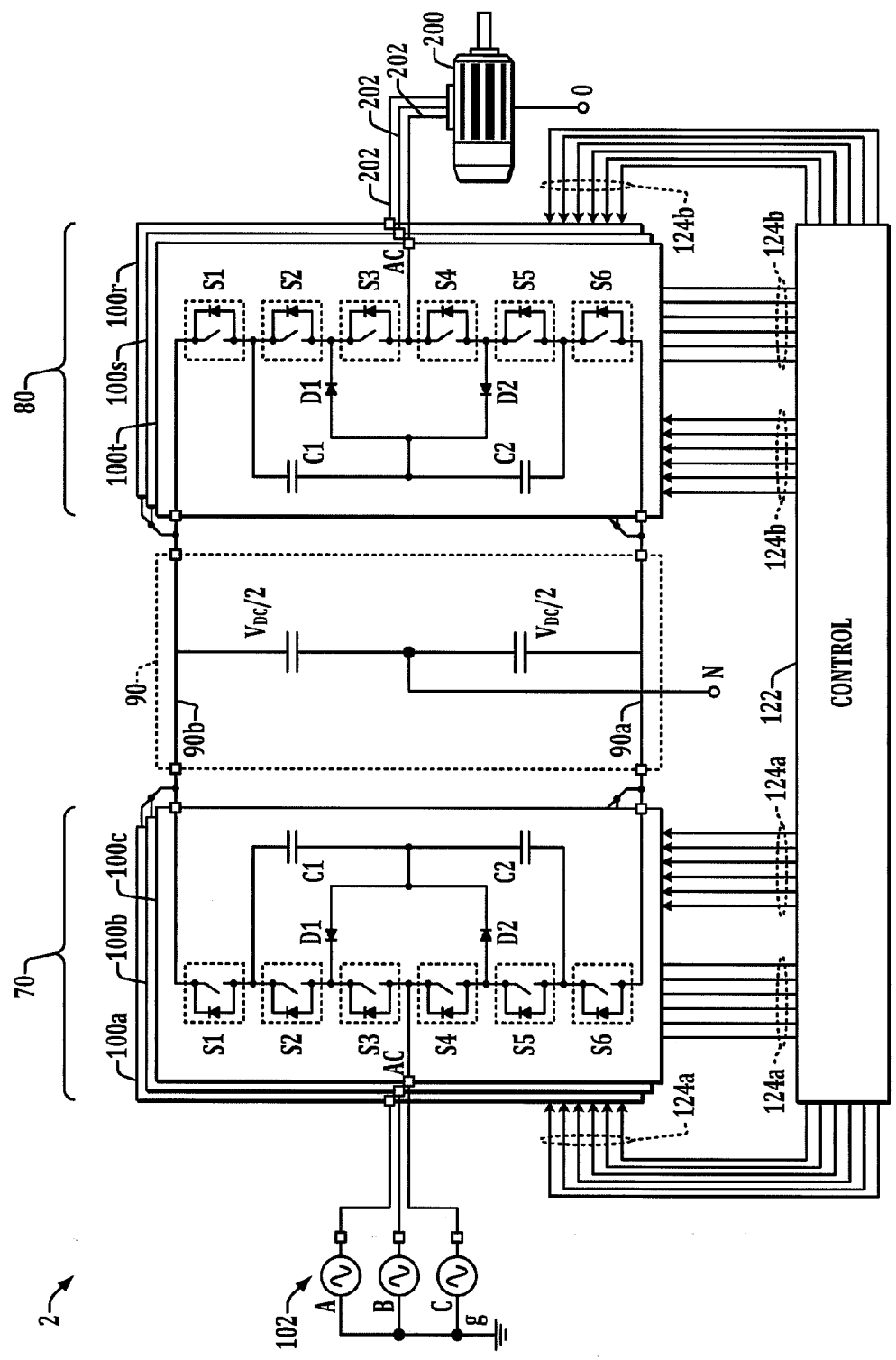
FIG. 3 is a schematic diagram illustrating three NNPC power converters and associated DC supplies for providing a three-phase voltage output to drive a motor load.
Figure 4:
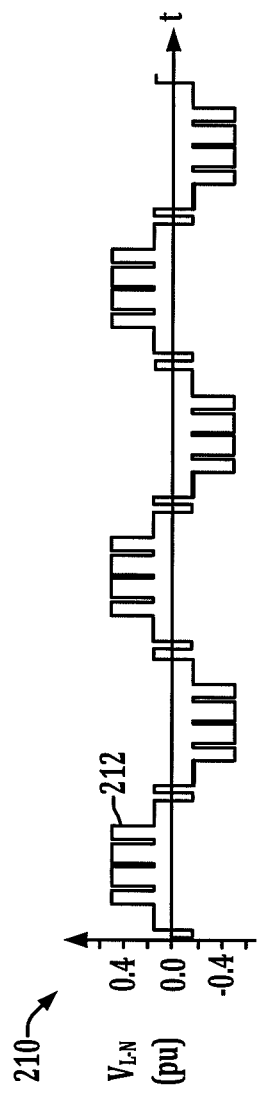
FIG. 4 is a graph showing a four-level line-to-neutral voltage output waveform for the NNPC power converter of FIGS. 1 and 2.
Figure 5:
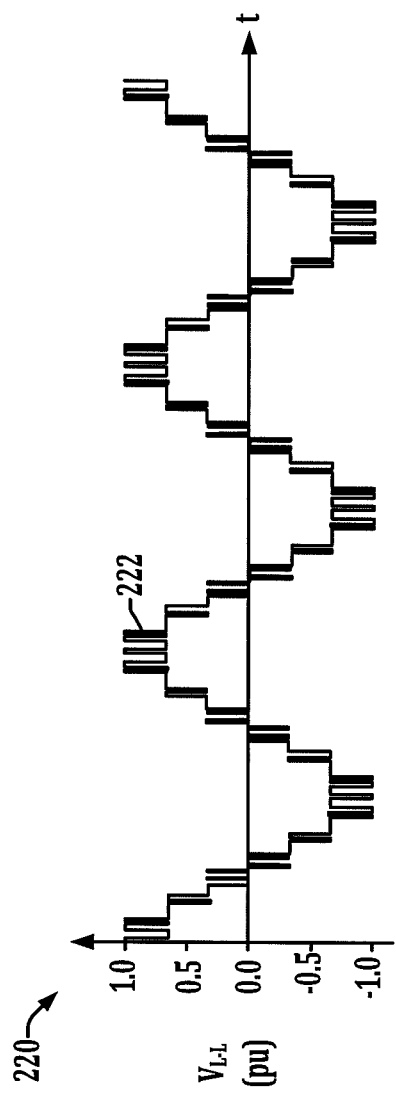
FIG. 5 is a graph illustrating a seven-level line-to-line voltage output waveform for the three-phase motor drive implementation of FIG. 3.

As best seen in FIG. 2, the controller 122 provides the switching control signals 124 to the switches S1-S6 in pulse width modulated (PWM) form so as to provide a multilevel output voltage (e.g., line-to-neutral voltage $V_{AN}$) at the inverter output node 116. In the illustrated embodiment, for instance, the controller 122 provides the switching control signals 124 to the switches S1-S6 to provide the output voltage $V_{AN}$ at one of four distinct line-to-neutral voltage levels. A graph 210 in FIG. 4 illustrates an exemplary four-level line-to-neutral voltage waveform 212 ($V_{AN}$) at the inverter output node 116 relative to the neutral node "N". In FIG. 3, three NNPC stages 100a, 100b and 100c are connected to corresponding phases A, B and C of a three phase power source 102 to form a three phase rectifier circuit 70 providing DC voltage in a DC bus circuit 90 including two DC bus capacitances of equal value, with a connecting node providing a system neutral N. As seen in FIG. 3, moreover, three different NNPC converter stages 100r, 100s and 100t may be connected to the positive and negative lines 90a and 90b of the DC bus circuit 90 to form a three phase multilevel inverter 80 providing AC output voltages to motor phase lines 202 to drive a three-phase motor load 200, with the controller 122 providing a set of inverter switching control signals 124b to each of the NNPC stages 100r-100t. FIG. 5 illustrates a graph 220 showing an exemplary line-to-line voltage waveform 222 in the system of FIG. 3, in which the controlled switching of the three NNPC inverter stages 100r, 100s and 100t at relative phase angles of 120° provides a seven-level line-to-line voltage waveform 222 for driving the motor load 200.

As further shown in FIG. 3, moreover, the inventors have appreciated that the system common mode voltage Vcm in the AC-DC-AC power converter 2 constructed using back-to-back NNPC or other back-to-back multilevel converter configurations is the sum of the common mode voltage contribution Vcmr of the rectifier 70 and the common mode voltage contribution Vcmi of the inverter 80. In the illustrated configuration having a neutral node "N", and input ground node "g", and an output zero voltage or neutral node "0", where the rectifier contribution Vcmr=Vg−Vn, the inverter contribution Vcmi=Vo−Vn, and the overall or total contribution in the power conversion system 2 is given by Vcm=Vog=Vcmi−Vcmr. Furthermore, certain aspects of the present disclosure advantageously provide for operation of the back-to-back multiphase multilevel conversion system 2 by provision of the rectifier and inverter switching control signals 124 by the controller 122 so as to facilitate offsetting of common mode voltage contributions of the rectifier 70 and the inverter 80. In some cases, the switching control signals 124a provided to the rectifier stages 100a-100c and the inverter switching control signals 124b provided to the multilevel inverter stages 100r-100t provide for complete or at least partial cancellation, with the inverter common mode contribution completely or at least partially offsetting or canceling the common mode voltage contribution associated with the rectifier 70, as described further below in connection with FIGS. 8-12.

Moreover, the controller 122 provides the switching control signals 124 in certain embodiments so as to control charging and discharging of the switched capacitors C1 and C2 in order to regulate the corresponding capacitor voltages $V_{C1}$ and $V_{C2}$ of the individual stages 100 to a target fraction of the DC voltage $V_{DC}$ of the DC bus circuit 90. The control of the capacitor voltages $V_{C1}$ and $V_{C2}$, moreover, facilitates substantially equal distribution of the voltages seen at the individual switching devices S1-S6 of a given stage 100. FIG. 2 illustrates an exemplary switching state table 126 for a given stage 100 showing six possible switching vectors V1, V2, V3, V4, V5 and V6 corresponding to different switching states of the NNPC switching devices S1-S6, along with corresponding line-to-neutral voltage values relative to the input DC level $V_{DC}$, where a "1" indicates the corresponding switch S is 'on' or conductive. In addition, the table 126 shows corresponding distinct voltage levels "L" at the AC terminal of the corresponding stage 100, in this case, providing four distinct voltage levels relative to the neutral N.

The switching vector V1 in FIG. 2 corresponds to a first level "3", redundant switching vectors V2 and V3 provide a second voltage level "2", the switching vectors V4 and V5 both provide a third level "1", and the sixth switching vector V6 provides a fourth level "0". Specifically, the first vector V1 provides an output voltage level of $+V_{DC}/2$, the second and third switching vectors V2 and V3 are redundant with one another relative to the line-to-neutral output voltage, each yielding a value of $+V_{DC}/6$. Vectors V4 and V5 are also a redundant switching state pair, each providing an output value of $-V_{DC}/6$, and the final switching state or vector V6 yields an output voltage of $-V_{DC}/2$. As seen in FIG. 2, moreover, the charging and discharging of the capacitors C1 and C2 is controlled through redundant vector selection, where the effect on the corresponding capacitor voltages may be different for the redundant switching states allowing intelligent vector selection to control the capacitor charging and/or discharging. For example, if the desired output voltage level is to be $V_{DC}/6$, vector V2 can be selected to charge C1 if the output current $I_{OUT}$ is positive (>0), or to discharge C1 if the output current is negative. Alternatively selection of the redundant vector V3 discharges C1 and C2 for positive output current, and charges these capacitors C1 and C2 if the output current is negative. As seen in the table 126 of FIG. 2, moreover, similar charging and/or discharging choices can be made by selection in the controller 122 from among redundant vectors V4 and V5 where the desired output voltage level is $-V_{DC}/6$.

Figure 6:
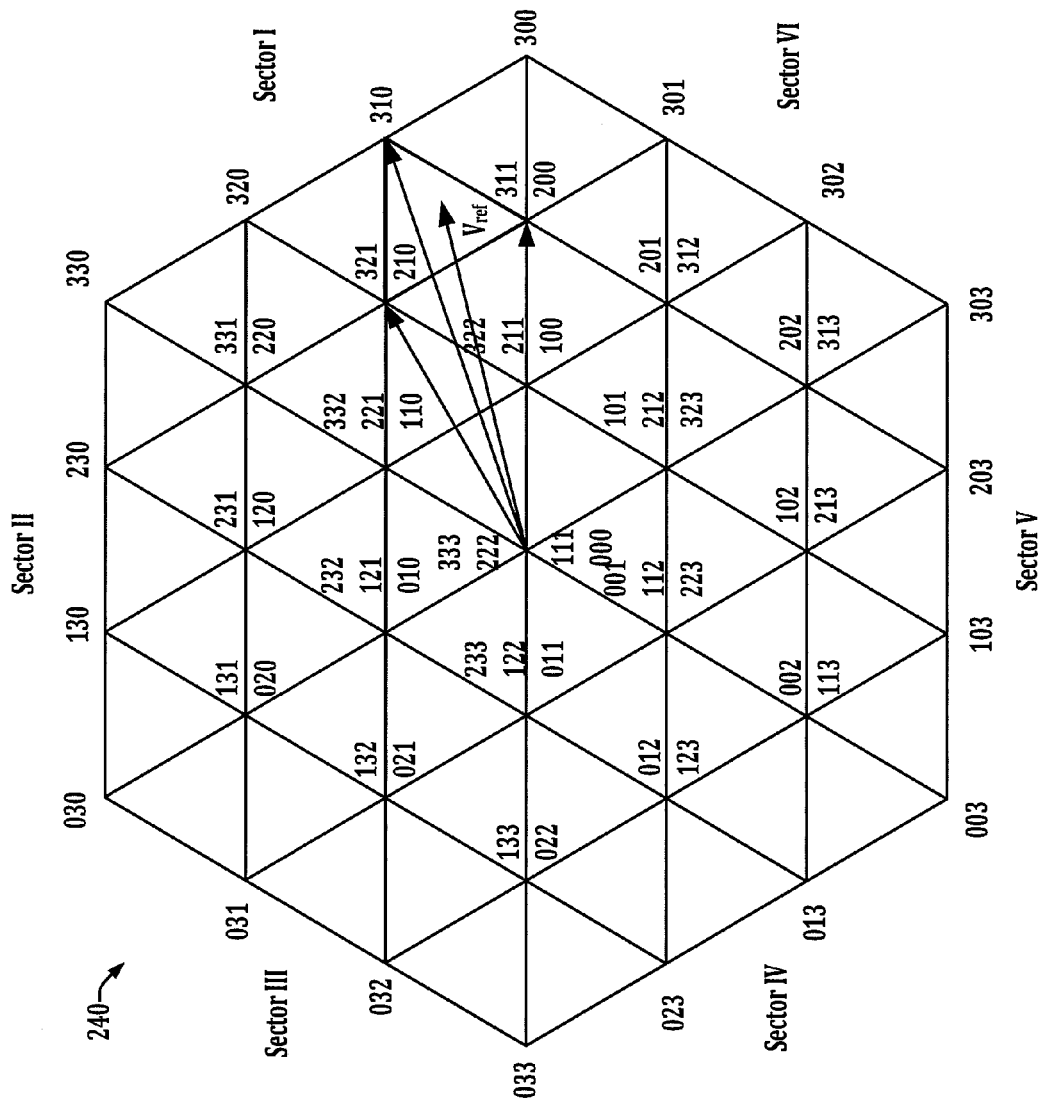
FIG. 6 is a graph illustrating an exemplary space vector modulation diagram showing the possible NNPC module line-neutral output levels for the three phase power conversion system of FIG. 3.

Referring also to FIG. 6, the controller 122 provides the control signals 124 to the stages 100 of both the rectifier 70 and the inverter 80 as pulse width modulation switching control signals using space vector modulation according to a reference vector derived from a desired output load condition in order to provide common mode voltage control as well as capacitor balancing as shown in the graph 240 of FIG. 6. The controller 122 determines relative on times (dwell times) for three control vectors $V_1$, $V_2$ and $V_3$ (or four vectors when synthesizing a virtual vector se described further below) surrounding the current position of the reference vector $V_{ref}$ as shown in FIG. 6, where the reference vector $V_{ref}$ has a corresponding modulation index or amplitude (M) and corresponding phase angle θ, and rotates throughout the space vector modulation diagram 240 according to a desired motor load position and torque in certain motor drive or other power conversion system implementations.

Figure 7:
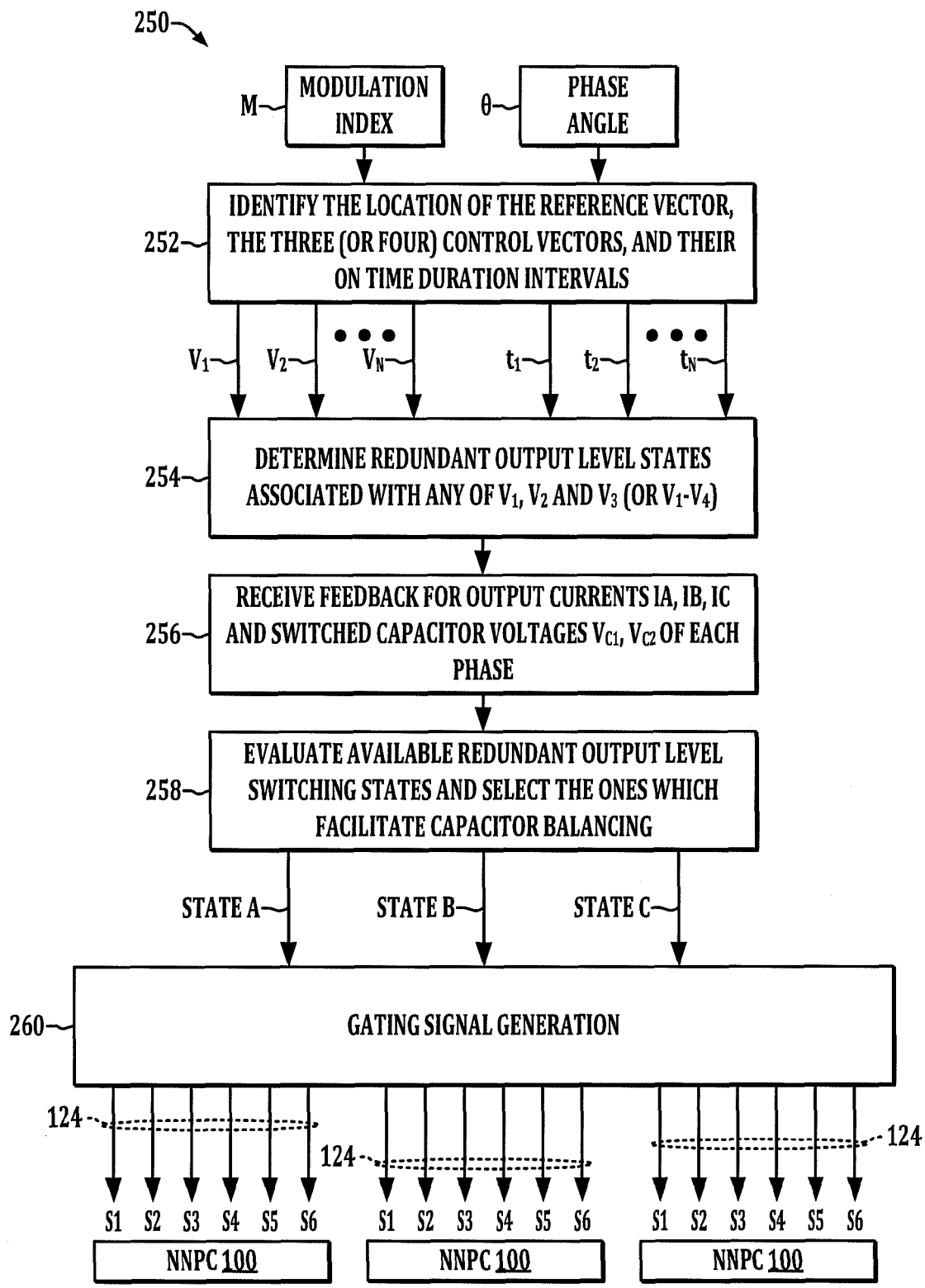
FIG. 7 is a flow diagram illustrating an exemplary pulse width modulation process in the NNPC power converter controller of FIGS. 1 and 2 to provide switching control signals to one or more NNPC power converters to provide a multilevel output voltage and to control charging and discharging of the flying capacitors to a predetermined level.

FIG. 7 illustrates a process 250 for generating pulse width modulated switching control signals 124, which can be implemented in the controller 122 of the NNPC power converter 2 of FIGS. 1-3. The process 250 is illustrated and described below in the form of a series of acts or events, although the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 250 and other methods of the disclosure may be implemented in hardware, processor-executed software, or combinations thereof, such as in the exemplary controller 122, and may be embodied in the form of computer executable instructions stored in a tangible, non-transitory computer readable medium, such as in a memory operatively associated with the controller 122 in one example.

In operation, the switching control signals 124 are provided to the NNPC switches S1-S6 to generate the multilevel output voltage $V_{AN}$ for each inverter output phase and to control charging and discharging of the capacitors C1 and C2, while reducing or mitigating common mode voltages in the system 2. The example of FIG. 6 is for a three phase system (e.g., FIG. 3 above), in which the controller 122 performs space vector modulation to generate the switching control signals 124 for each of the three NNPC converters 100a, 100b and 100c of the rectifier 70, as well as for each of the converters 100r, 100s and 100t associated with the output phases are connected to the motor load 200. In certain implementations, the selection of redundant switching states for controlling the inverter 80 (e.g., from table 126 in FIG. 2) is done based on one or more feedback values regarding the output current $i_{OUT}$ (e.g., $I_A$, $I_B$, and $I_C$ for the three-phase example) and switched capacitor voltages $V_{C1}$ and $V_{C2}$ for each of the NNPC converters 100r-100t. As seen in FIG. 7, the illustrated process 250 shows space vector modulation processing in which the desired output state (e.g., motor position and torque) is determined according to a received modulation index "m" and phase angle θ, and similar processing is performed within the controller 122 with respect to a rotating reference vector associated with control of the active rectifier 70. The modulation index and phase angle are received and used at 252 to identify the location of the reference vector $V_{ref}$ (FIG. 6). The reference vector, in turn, is used to identify the three surrounding control vectors $V_1$, $V_2$ and $V_3$ (e.g., FIG. 6, or four surrounding original vectors for synthesizing a virtual vector), and space vector modulation processing is used to determine the corresponding "on-time" or dwell time duration intervals $t_1$, $t_2$ and $t_3$ (and optionally $t_4$) at 252 in FIG. 7.

At 254, the control vectors and duration intervals are used to determine the redundant output levels (if any) for each motor output phase that are associated with one, some or all of the surrounding vectors $V_1$, $V_2$ and $V_3$ (and sometimes an additional vector $V_4$ for virtual vector synthesis). For example, the state table 126 in FIG. 2 indicates that output level states V2 and V3 are redundant with one another (level "2"), as are V4 and V5 (level "1"). Feedback is received at 256 for the output currents $I_R$, $I_S$, and $I_T$ as well as the switched capacitor voltages $V_{C1}$ and $V_{C2}$ for each phase. The controller 122 evaluates the available output level states for each motor phase, and selects from the redundant output levels those that facilitate capacitor balancing for the individual phases. In the illustrated example, the capacitor voltages (Vci) are regulated by selecting from available redundant states to selectively charge or discharge the capacitors, such as the voltages $V_{C1}$ and $V_{C2}$ in FIG. 1 above. In accordance with certain aspects of the present disclosure, unlike conventional NPC power converters, the target regulated flying capacitor voltage value in certain embodiments is less than $V_{DC}/2$. For example, in the example of FIG. 1, the capacitor voltages $V_{C1}$ and $V_{C2}$ are controlled or regulated through intelligent redundant output level state selection by the controller 122 to be $V_{DC}/3$. In other nonlimiting examples, the target value can be another value that is less than half the DC input voltage, such as $V_{DC}/4$ or $V_{DC}/5$.

With the switching states selected for each of the three phases, gating signal generation is performed by the controller 122 at 260 in FIG. 7 in order to generate the three sets of switching control signals 124 for the switching devices S1-S6 of each corresponding NNPC converter stage 100. In this manner, the controller 122 operates to cause the appropriate output voltages to be provided to the motor load 200 via the inverter stages 100r, 100s and 100t (FIG. 3) and also regulates the voltages across the capacitors C1 and C2 of each of these NNPC power stages 100, and the controller 122 performs similar operation of the multilevel switching rectifier stages 100a, 100b and 100c via the control signals 124a. This careful regulation of the switched capacitor voltages $V_{C1}$ and $V_{C2}$, in turn, facilitates operation of the NNPC converters 100 to provide the inverter output voltages (e.g., $V_{AN}$ in FIG. 2) at substantially equally spaced output levels. For instance, in the example of FIG. 2, the output voltages are provided at four distinct levels, spaced in steps of $V_{DC}/3$. Thus, the use of a regulated lower capacitor voltage level in the illustrated NNPC converters 100 facilitates equal distribution of the voltages seen by the switching devices S1-S6. Consequently, all the switching devices S1-S6 experience the same voltage stress, and none of the devices need be oversized.

Referring now to FIGS. 3 and 8-12, the disclosure provides multilevel power conversion systems 2 having multiple NNPC power converters 100 and/or other forms of multilevel converters, wherein the system 2 of FIG. 3 includes three NNPC converters 100a-100c coupled to an AC input power source which operate to receive incoming AC voltages at the corresponding AC input terminals (e.g., terminal 120 in FIG. 1 above), with DC terminals connected to positive and negative DC bus rails 90a and 90b of the DC bus circuit 90, whereby the first set of three NNPC converters 100a-100c provides a three phase active rectifier. The output of these rectifier stages provides a DC bus voltage across the DC bus circuit 90, wherein a neutral point "N" is established at the DC bus midpoint or center node joining the DC bus capacitors. The DC bus voltage $V_{DC}$ is provided as an input to the DC input terminals (terminals 101 and 102 in FIG. 1 above) of another set of three NNPC stages 100r-100t, with the inverter outputs of these stages 100 providing AC output voltages to drive the motor load 200. The system 2 of FIG. 3 may be used, in one non-limiting example, to provide a desired output voltage, for example 2 kV-7.2 kV, using a back-to-back configuration of six NNPC stages 100 for a total of 36 switches and 12 clamping components (e.g., diodes or active clamping switches).

In accordance with one or more aspects of the present disclosure, the controller 122 advantageously provides the rectifier and inverter switching control signals 124 to the converter switching devices S2-S5 and to the switched capacitor circuit switching devices S1 and S6 of the individual converters 100 to control charging and discharging of the stage capacitors C1 and C2 for regulating the capacitor voltages as described above, as well as to facilitate cancellation or reduction of the common mode voltage contributions of the rectifier 70 and the inverter 80. FIG. 8 illustrates a table 262 showing common mode voltages associated with the possible module output levels in the space vector modulation diagram 240 of FIG. 6. The entries in the table 262 of FIG. 8 correspond to all the possible switching states in the three-phase multilevel system 2 of FIG. 3, in which the individual values or levels range from zero through three, with a corresponding value for each phase. In the case of the output inverter 80, for instance, a value of "210" for switching vector #12 in the table 262 indicates that the first output stage 100r is to be operated at level "2", corresponding to one of the two redundant vectors V2 or V3 in the table 126 of FIG. 2 above, whereas the second stage 100s is to be operated at level "1", corresponding to one of the two redundant vectors V4 or V5 in FIG. 2, and the third stage 100t is to be operated at level "zero" corresponding to switching vector V6 in the table 126 of FIG. 2.

As shown in dashed line in a table 262 of FIG. 8, moreover, certain possible switching states (#21-#44) have minimal positive or negative common mode voltage values (Vcm). In particular, switching states #21-#32 for a given stage C provide a common mode voltage contribution of approximately $-V_{DC}/18$ which is a negative minimal value of all the possible switching states shown in the table 262, while switching states #33-#44 provide a minimal positive value of $+V_{DC}/18$.

Figure 9:
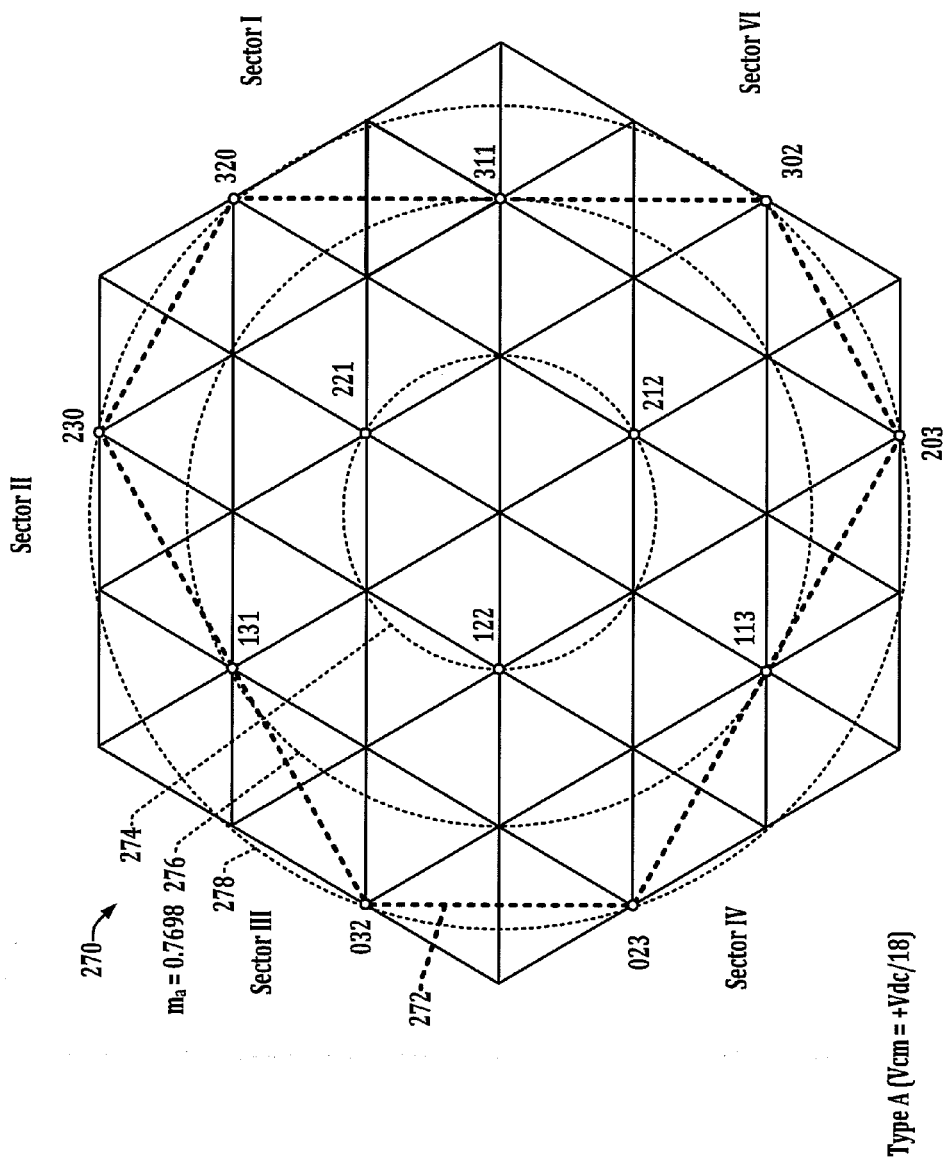
FIG. 9 is a space vector modulation diagram for a first type of operation (type A) of the rectifier or inverter NNPC stages of three-phase system of FIG. 3 using only the switching states in FIG. 8 providing $+V_{DC}/18$ common mode levels.

FIG. 9 shows a space vector modulation diagram 270 for a first type of operation (Type A) of the rectifier or inverter stages 100 of the three-phase system 2 in FIG. 3 using only the switching states #33-#44 of the table 262 in FIG. 8 for which the common mode voltage contribution of the corresponding multilevel rectifier stage or multilevel inverter stage 100 is a minimal positive value (e.g., $+V_{DC}/18$). As seen in FIG. 9, this includes states 122, 212 and 221 situated on a circle 274 defining a first modulation index level for space vector modulation of the entire system 2 of FIG. 3, as well as states 113, 131 and 311 along a second circle 276 associated with a second modulation index level of 0.7698, and six further states 023, 032, 203, 230, 302 and 320 along a third larger circle 278 associated with a still larger modulation index level. As seen in FIG. 9, moreover, the first subset of switching states #33-#44 for the Type A space vector modulation control in FIG. 9 define a region identified in dashed line at 272. The first operation type (Type A) defines a first subset of the possible switching states in the space vector modulation diagram 270 with minimal positive absolute common mode voltages ($V_{DC}/18$ in the illustrated four-level converter case), and includes the states 113, 131 and 311 along the second circle 276 associated with the second modulation index level, as well as minimal absolute common mode voltage states along the first and third circles 274 and 278 associated with the first and third modulation index levels. In particular, this selected subset for the Type A operation advantageously facilitates common mode voltage control without unduly increasing switching noise, compared with other approaches having no states from the second circle 276 available for operation of the converter stage 100.

Figure 10:
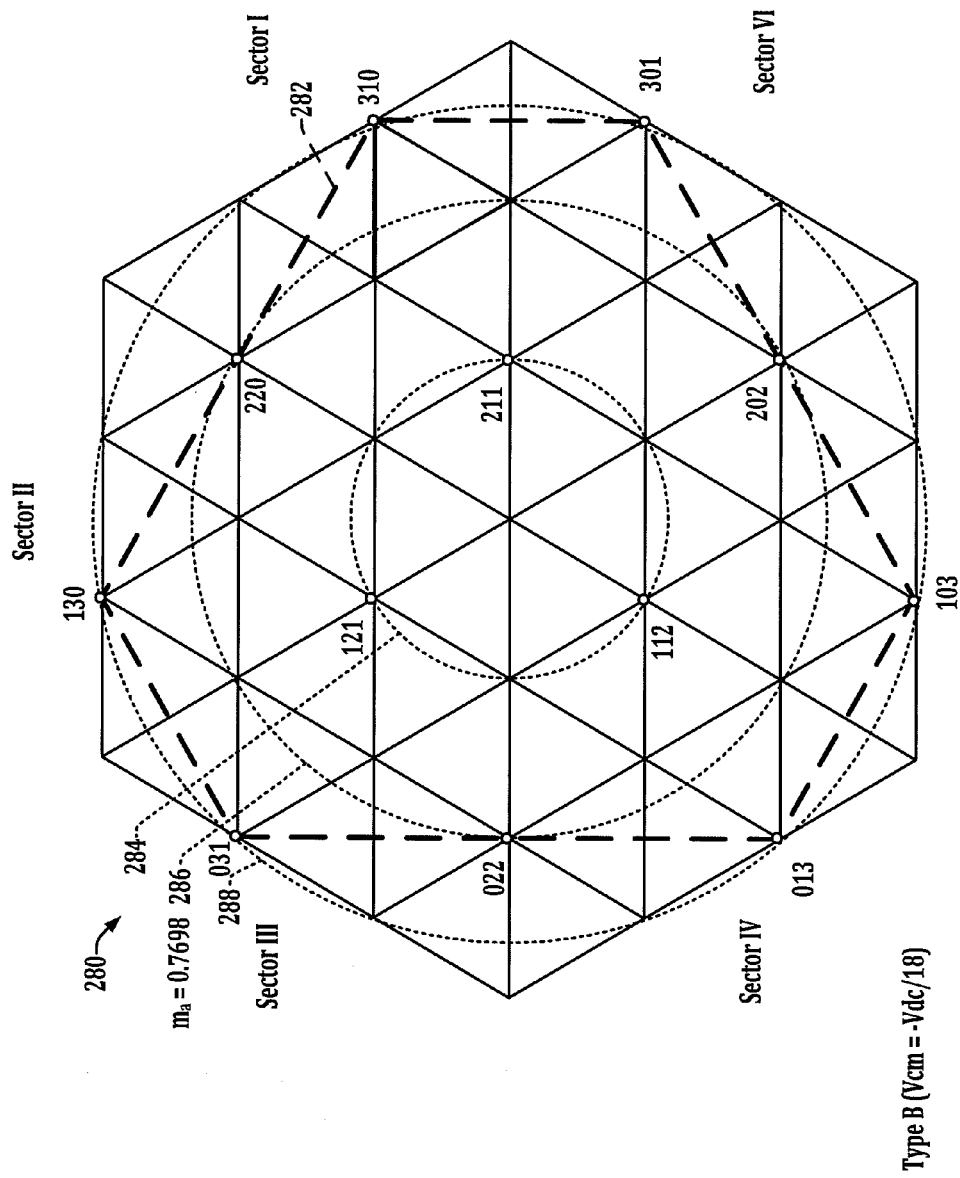
FIG. 10 is a space vector modulation diagram for a second type of operation (type B) of the system of FIG. 3 using only switching states in FIG. 8 providing $-V_{DC}/18$ common mode levels.

FIG. 10 shows a second type of operation (Type B) in a space vector modulation diagram 280 using only the switching states #21-#32 associated with the minimal negative common mode voltage value ($-V_{DC}/18$). As seen in FIG. 10, the associated switching states #21-#32 include states 121, 112 and 211 on a circle 284 defining first modulation index level, as well as states 022, 202 and 220 along a second circle 286 associated with a modulation index of 0.7698, and six states 013, 031, 103, 130, 301 and 310 along an outer circle 288 corresponding to an even higher modulation index, wherein the Type B switching state subset #21-#32 defines a region 282 shown in dashed line in FIG. 10. As seen in FIGS. 8 and 10, the subset of states used for Type B operation have minimal negative absolute common mode voltages ($-V_{DC}/18$), and includes the states 022, 202 and 220 along the second circle 286 associated with the second modulation index level, as well as minimal absolute common mode voltage states along the first and third circles 284 and 288 associated with the first and third modulation index levels.

It is noted that embodiments employing the Type A and/or Type B operation using the subsets of possible switching states for which the absolute common mode voltages are minimal can be employed in association with multilevel converters 100 of any even integer number N of AC levels where N≥4. For example, although the embodiments described in connection with FIGS. 9-12 and those of FIGS. 13-18 are illustrated and described herein in the context of four level converters 100, other embodiments are possible using 6-level converters, 8-level converters, or other even-level converters for which N is greater than or equal to 4.

Figure 11:
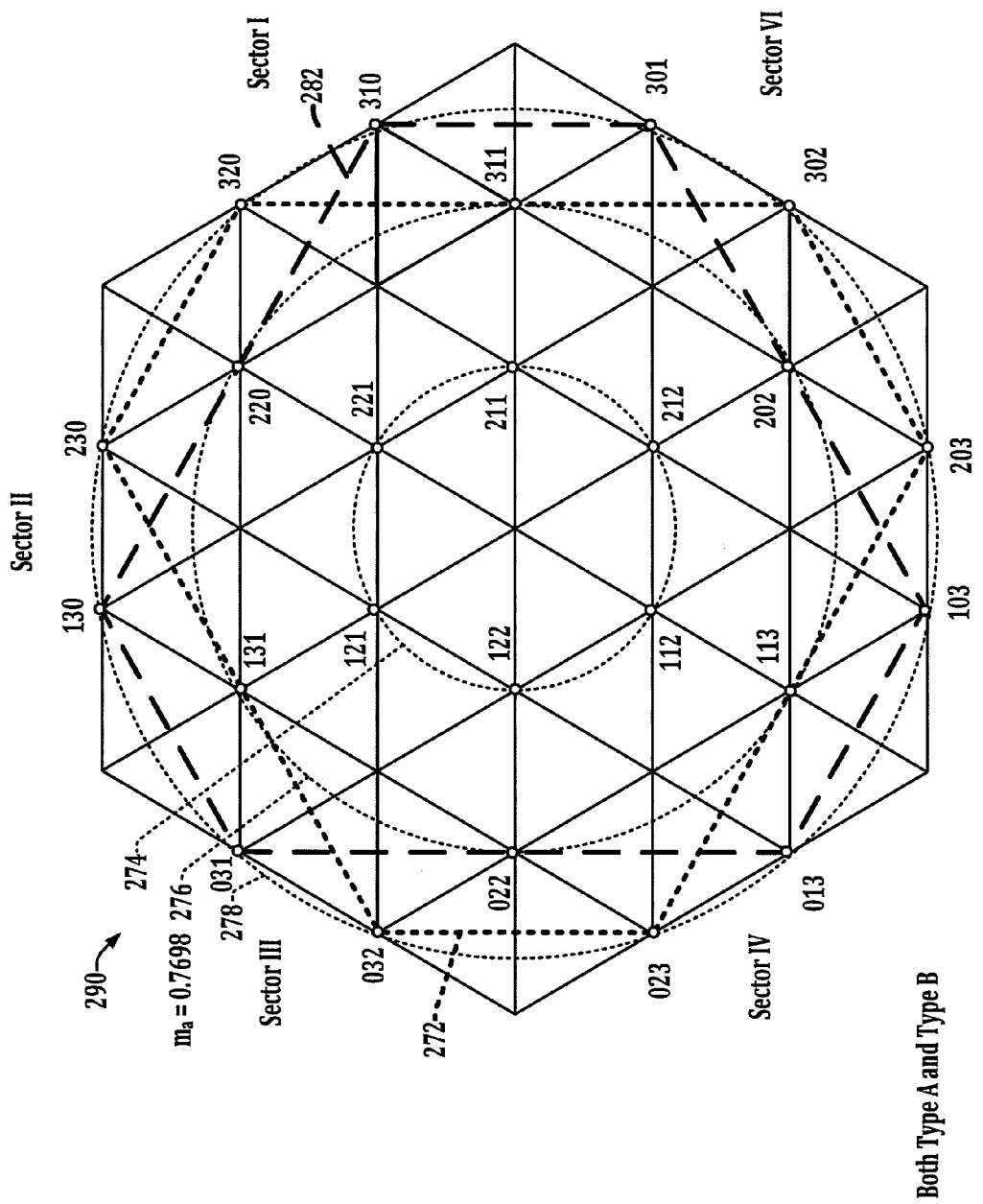
FIG. 11 is a space vector modulation diagram including a subset of switching states providing either $+V_{DC}/18$ or $-V_{DC}/18$ common mode levels in operating the system of FIG. 3.

FIG. 11 provides a space vector modulation diagram 290 showing the switching states #21-#44 from the table 262 in FIG. 8, illustrating operation using both Type A and Type B using the two subsets of available switching states for which the corresponding common mode voltage contribution is a minimal positive or negative value (e.g., $+/-V_{DC}/18$).

FIG. 12 illustrates a table 292 showing four different cases by which the controller 122 operates the rectifier 70 and the inverter 80 via the corresponding switching control signals 124a and 124b, respectively in the system 2 of FIG. 3 above. A first case (case "1" in the table 292) corresponds to situations in which the current modulation indices (e.g., $m_r$ and $m_i$) for the rectifier 70 and the inverter 80 are both less than or equal to a predetermined value, such as 0.7698 in the illustrated example. In this case, the controller 122 advantageously facilitates cancellation of the common mode voltage contribution of the rectifier 70 and the inverter 80 by operating stages of both the rectifier 70 and the inverter 80 according to the same "Type" (e.g., Type A or Type B) by using only the switching states of the corresponding subset (e.g., switching states #21-32 for Type B operation of both the rectifier 70 and the inverter 80, or switching states #33-#44 for Type A operation of both the rectifier 70 and the inverter 80). In this manner, substantial or complete cancellation or offsetting of the common mode voltage contributions of the rectifier 70 and the inverter 80 are facilitated. It is noted, moreover, that each of the rectifier 70 and the inverter 80 will have a corresponding reference vector at any point in time, and the controller 122 performs typical space vector modulation to determine corresponding dwell times at three bounding switching state selected from the subsets defining Type A or Type B for a given reference vector location using known space vector modulation techniques.

As further shown in FIG. 12, where one or the other of the modulation indices associated with a first one of the rectifier 70 and the inverter 80 exceeds the predetermined value (e.g., cases 2 or 3 in the table 292 with either of these modulation indices being greater than 0.7698 and the other being less than or equal to 0.7698 in the illustrated example), the controller 122 operates the converters 100 of the first one of the rectifier 70 and the inverter 80 using both Type A and Type B subsets an alternating fashion (e.g., switching states #21-#44 in FIG. 8), for example, as shown in the space vector modulation diagram 290 of FIG. 11. In this regard, when the first one of the rectifier 70 and the inverter 80 has its reference vector within the regions covered by the Type A subset, then both it and the other one of the rectifier 70 and the inverter 80 are operated using the switching states from the Type A subset. Once the reference vector for the first one of the rectifier 70 and the inverter 80 for which the modulation index is greater than 0.7698 moves to a region covered instead by the Type B subset, then both rectifier 70 and inverter 80 are operated using the switching states from the Type B subset. It is noted that this technique advantageously facilitates higher modulation index operation of the AC-DC-AC system 2 of FIG. 3, while still mitigating common mode voltage issues in the system 2. Moreover, during operation using a selected subset of the possible three phase switching state combinations of FIG. 8, the controller 122 in certain embodiments advantageously selects from among redundant states associated with levels "1" and "2" for each given stage 100 in order to perform internal capacitor voltage balancing as described above.

Figure 13:
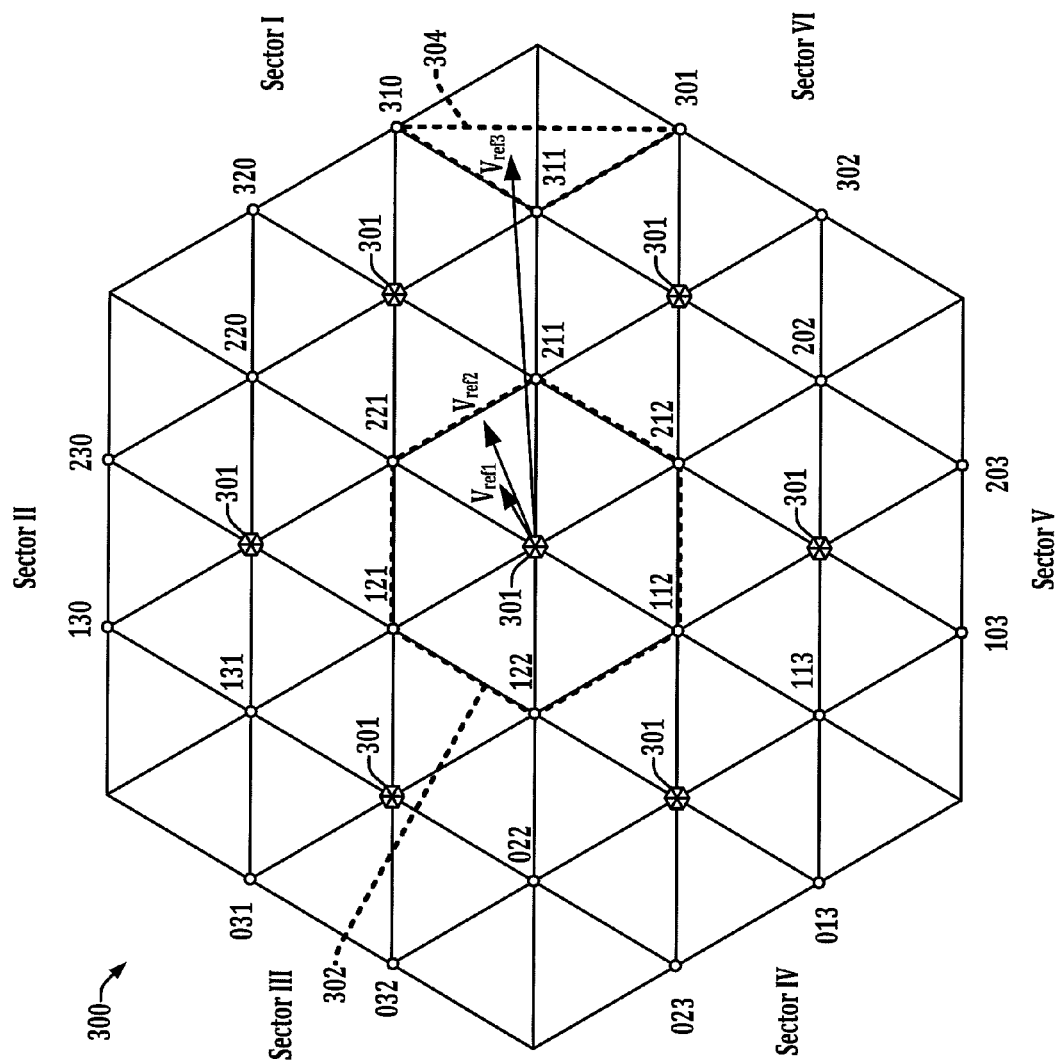
FIG. 13 is a space vector modulation diagram for operating a three-phase multilevel inverter using 24 original switching vectors and some virtual vectors formed by original vectors in accordance with further aspects of the present disclosure.

Referring also to FIGS. 13-18, in accordance with further aspects of the present disclosure, the controller 122 provides the inverter switching control signals 124b to individual ones of the multilevel inverter stages 100r, 100s and 100t via space vector modulation using only a subset of the possible switching states for which the common mode voltage contribution of the stage 100 is a minimal positive or negative value in order to mitigate common mode voltages within the system 2 of FIG. 3. For example, FIG. 13 shows a space vector modulation diagram 300 for operating the three-phase multilevel inverter 80 of FIG. 3 using 24 original vectors and virtual vectors 301 formed by original vectors of the Type A or Type B subset of the possible switching states (in this case the same subset of states shown in FIG. 11 above). As seen in the space vector modulation diagram 300, the original switching vector states are shown as circles corresponding to the switching states #21-#44 in the table 262 of FIG. 8 and virtual vectors 301 are indicated using small hexagons with stars, wherein the resulting regions of the hexagonal overall space vector modulation diagram 300 available for operation by the controller 122 includes hexagonal portions as well as triangle portions. For example, FIG. 13 illustrates a hexagonal portion 302 in dashed line in which first and second reference vectors $V_{ref1}$ and $V_{ref2}$ are located, as well as a triangular region 304 in which a third reference vector $V_{ref3}$ is located for illustrative purposes. The concepts of FIGS. 13-18 are also applicable to operation of an active rectifier using multilevel converter stages 100, in which the rectifier switching control signals 124a can be provided to the individual rectifier stages 100a, 100b and 100c (FIG. 3) using only the possible switching states for which the common mode voltage contribution of the stages a minimal positive or negative value.

Figures 14, 15, 16, 17, 18:
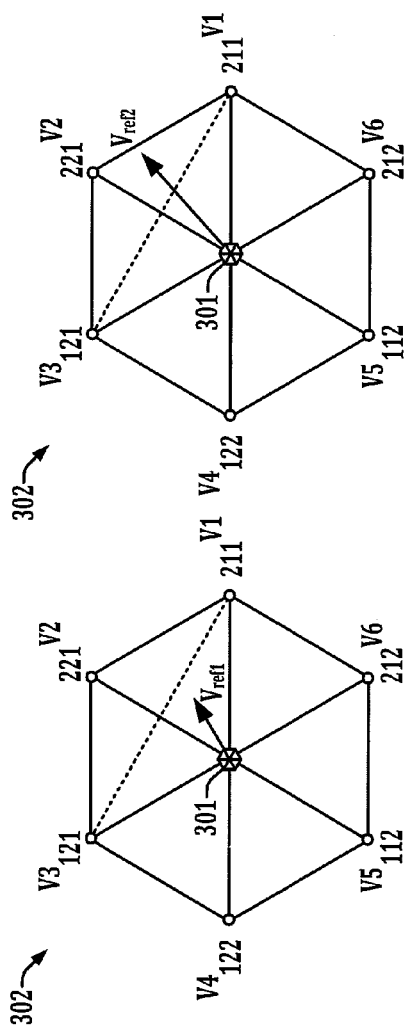
FIG. 14 is a partial space vector modulation diagram showing an exemplary synthesis for a reference vector in a low modulation index portion of a sector of a specific hexagonal region of the space vector modulation diagram of FIG. 13 using four original vectors and a synthesized virtual vector in the center using the four original vectors.
FIG. 15 illustrates space vector modulation diagram showing an exemplary synthesis for a reference vector in a higher modulation index portion of the sector in the hexagonal region of the space vector modulation diagram of FIGS. 13 and 14 using three original vectors and a synthesized virtual vector in the center using the three original vectors.
FIG. 16 illustrates a table showing exemplary space vector modulation switching sequences for operation of the multilevel inverter stage in the examples of FIGS. 14 and 15.
FIG. 17 illustrates a triangular portion of the space vector modulation diagram of FIG. 13.
FIG. 18 provides a table illustrating three exemplary five segment switching sequences for operation of the system in the triangular region of the space vector modulation diagram of FIG. 17.

FIGS. 14 and 15 further illustrate the hexagonal portion 302 of the overall space vector modulation diagram 300, including a dashed line segmenting the triangular portion into two portions in which the first and second reference vectors $V_{ref1}$, $V_{ref1}$ lie, and FIG. 16 shows a table 306 with two different types of inverter pulse width modulation switching sequences performed by the controller 122. In one possible implementation, the controller 122 performs a 7-segment switching sequence including three phase switching states 211-221-121-122-121-221-211 including six total switchings for each PWM cycle (Type A in the table 306 of FIG. 16). As seen in FIGS. 14 and 15, moreover, the hexagonal portion includes vectors V1-V6 at the outer boundaries of the hexagonal region 302, and the controller 122 advantageously synthesizes a virtual vector for the center position of the hexagonal region 302, whose corresponding switching state is omitted from the utilized subset of FIG. 13. In this manner, the contribution of the virtual or missing (center node) vector is virtualized by using the allowed switching states of the subset, thereby mitigating common mode voltage issues in the overall system 2. Specifically, the common mode voltages associated with the center node of the hexagonal region 302 (e.g., the center node of the space vector modulation diagram 240 in FIG. 6 above, including states 000, 111, 222, 333) are all greater than the minimal positive or negative common mode voltage values associated with the switching states #21-#44 as shown in FIG. 8 above, and hence the avoidance of these higher common mode voltage switching states facilitates reduced common mode voltages, with the contribution of the omitted switching states being virtualized by the controller 122 using permitted switching states which have a corresponding minimal positive or negative value in the illustrated embodiments.

Figure 21:
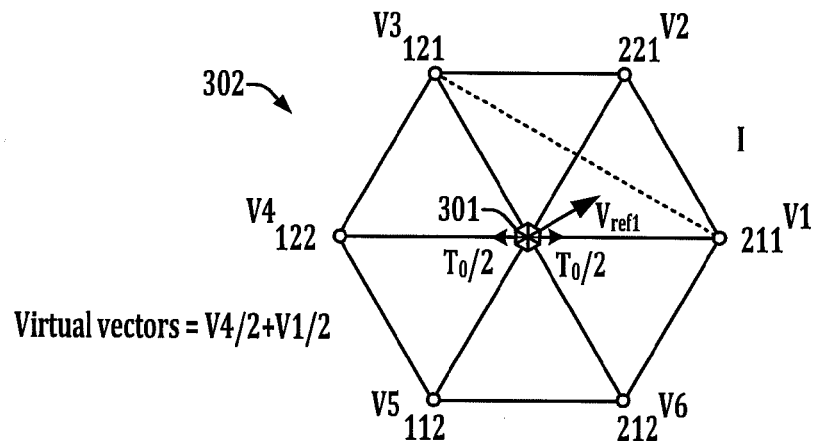
FIGS. 21-23 illustrate synthesis of exemplary virtual vectors using original vectors in certain space vector modulation embodiments.
Figure 22:
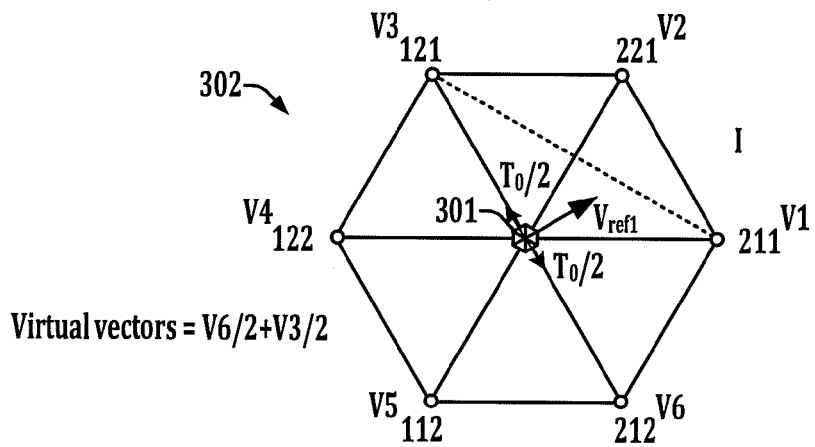
Figure 23:
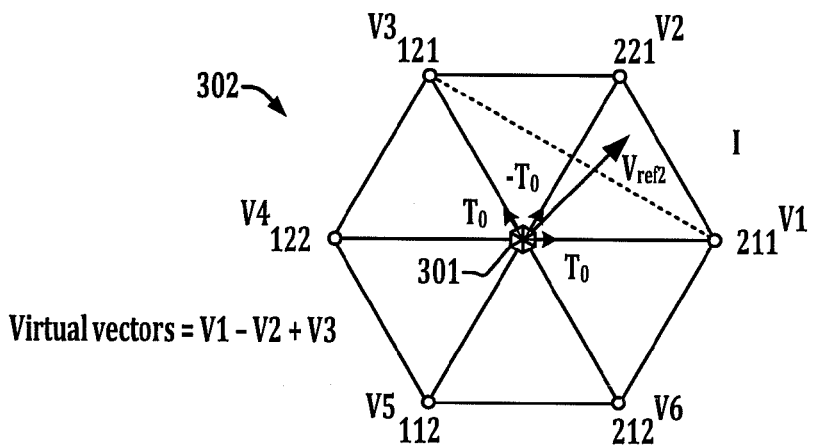

In the case of FIG. 14 ($V_{ref1}$), the controller 122 uses vectors 221 and 211 for synthesizing the reference vector position, as these bounds the triangular region created by the dashed line in FIG. 14. For the contribution of the virtual vector at the center of the illustrated hexagonal region 302, the controller 122 uses the additional vector 121 and the vector 122 in combination with corresponding additional dwell times associated with the vector 211 and 221 in order to synthesize the contribution of the virtual vector as further shown in FIGS. 21 and 23. The virtual vector in FIG. 14 is a combination of virtual vectors in FIGS. 21 and 23. Another possible implementation for synthesizing the virtual vector at the center of the illustrated hexagonal region 302 of FIG. 14 is further illustrated in FIG. 22, using the original vectors 121 and 212. For the example of the second reference vector $V_{ref2}$ in FIG. 15, the controller 122 performs a five-segment (Type B) switching sequence with four total switches 211-221-121-221-211 as shown in the table 306, again using the primary vectors 221 and 211 bounding the triangular region in which the reference vector lies, as well as an adjacent vector 121 used in conjunction with the vector 211 in order to synthesize the virtual vector at the center of the hexagonal region 302. This is further illustrated in FIG. 23, in which the controller 122 synthesizes the virtual vector at the center of the hexagonal region 302 using the original vectors 121, 211 and 221. FIGS. 21-23 illustrate exemplary virtual vector synthesis in certain embodiments of the controller 122, which can be employed in accordance with the common mode reduction techniques described above. In hexagon regions, such as region 302 of FIGS. 21 and 22, there are six switching states, one switching state at each vertex, and no switching state in the center of hexagon. Virtual vector can be constructed for the center node of hexagon to facilitate modulation. Different switching states can be employed to construct the virtual vector. Using region I as an example, three types of virtual vector construction methods are demonstrated in FIGS. 21-23. Type A uses V1 and V4 to construct the virtual vector at the origin of hexagon. Virtual vector can be expressed as V4/2+V1/2, which is shown in FIG. 21. Type B uses V3 and V6 to construct virtual vector at the origin of hexagon. Virtual vector can be expressed as V6/2+V3/2, which is shown in FIG. 22.

FIG. 23 shows a third type (Type C) using V1, V2 and V3 to construct the virtual vector at the origin of hexagon. The virtual vector can be expressed as V1−V2+V3, which is shown in FIG. 23. After the virtual vector is constructed at the origin of hexagon, the three nearest vectors can be used to synthesize the given reference Vref similar to conventional SVM method. If Type A virtual vector synthesis is used, the controller 122 can implement a five-segment switching sequence such as 211-221-122-221-211, where the number of switchings in a sampling period is 6. If Type B is chosen, seven-segment switching sequence such as 212-211-221-121-221-211-212 can be used, where the number of switchings in a sampling period is 6. If Type C is chosen, five-segment switching sequence such as 211-221-121-221-211 can be used, where the number of switchings in a sampling period is 4. FIG. 17 illustrates the third reference vector $V_{ref3}$ within the triangular region 304 of the original space vector modulation diagram 300 of FIG. 13, and the table 308 in FIG. 18 illustrates three different five-segment switching sequences, each having a total of four switchings in each PWM cycle. Since the triangular region 304 does not include any virtual vectors at the boundaries, normal pulse width modulation can be achieved using space vector modulation with the dwell times computed according to the bounding actual vectors 301, 310 and 311 as shown.

Figure 19:
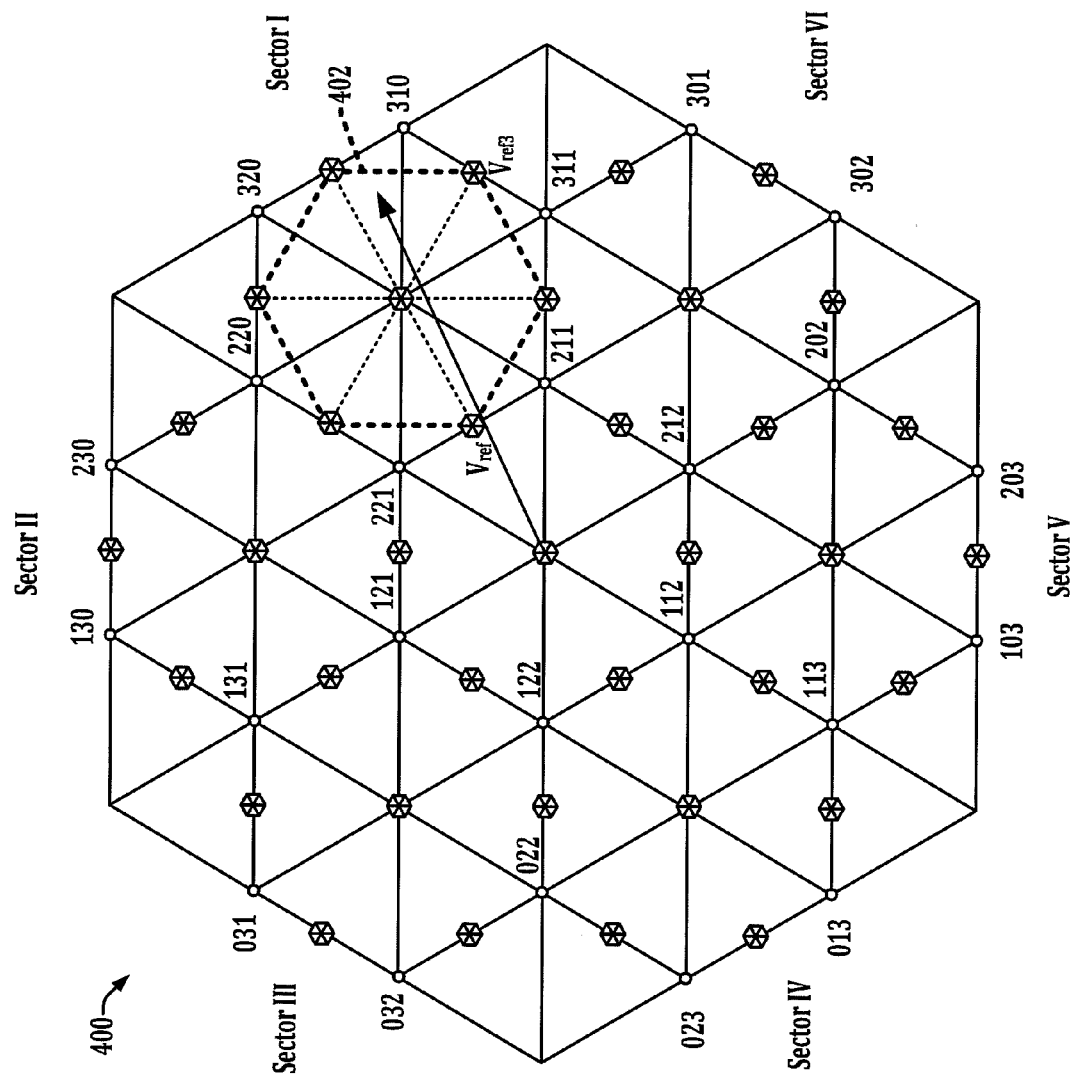
FIG. 19 is a space vector modulation diagram showing various virtual vectors and original vectors for operating a three-phase multilevel inverter of FIG. 3 to facilitate reduction in both magnitude and low order harmonic components in common mode system voltages based on exclusive use of virtual vectors.
Figure 20:
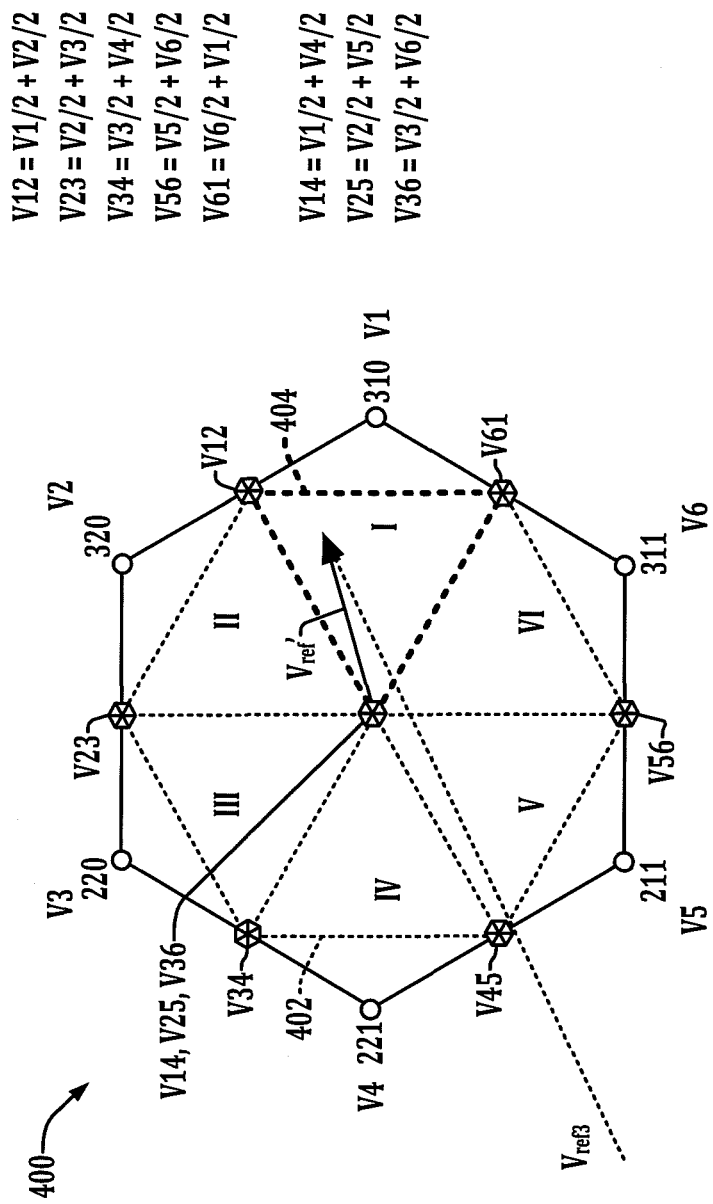
FIG. 20 illustrates a hexagonal region in the space vector modulation diagram of FIG. 19 in which the corner points and center define virtual vectors whose average common mode voltage are zero for controlling system common mode voltages.

Referring also to FIGS. 19 and 20, a different form of inverter space vector modulation can be implemented in certain embodiments of the controller 122 for providing the control signals 124b to the inverter 80 of FIG. 3, in which the controller 122 provides the switching control signals using directly only virtual vectors synthesized using actual vectors representing switching states of the subset of possible switching states according to a reference vector. Moreover, in various embodiments, the controller 122 constructs the virtual vectors such that the average common mode voltage is zero. As seen in the space vector modulation diagram 400 of FIG. 19, the switching state space in this case is segmented into hexagonal and triangular regions entirely bounded by virtual vectors. For example, FIGS. 19 and 20 illustrate an exemplary hexagonal region 402 in dashed line including sectors I-VI, centered around a virtual (excluded) vector location of the subset of switching vectors corresponding to minimal positive or negative common mode voltage values (e.g., the switching states illustrated in FIG. 11 above). FIG. 20 illustrates the exemplary dashed line hexagonal region 402, including a central virtual vector as well as virtual corner vectors V12, V23, V34, V45, V56 and V61. The virtual vectors in this case are synthesized via the controller 122 according to the actual switching vectors (included within the low common mode voltage subset of all possible switching states), with V12=V1/2+V2/2; V23=V2/2+V3/2; V34=V3/2+V4/2; V56=V5/2+V6/2; and V61=V6/2+V1/2. The central switching state in the hexagonal region 404, moreover, can be synthesized the controller 122 in one possible example using two of the oppositely positioned actual vectors, for example, wherein V14=V1/2+V4/2; or V25=V2/2+V5/2; or V36=V3/2+V6/2. A common feature of all the created virtual vectors in FIG. 19 and FIG. 20 is the average common mode voltage of each virtual vector is zero, which facilitates the elimination of low order harmonic components in inverter common mode voltage. In one possible implementation, the nearest three virtual vectors are used to synthesize given reference vector, for example, when the given reference $V_{ref}$ and a corresponding reference vector $V_{ref}'$ is situated within sector I as shown in FIG. 19.

The controller 122 in one embodiment utilizes virtual vectors V12, V61 and V36 and calculates the dwell time of vectors V12, V61 and V36. Using the computed dwell times of the virtual vectors V12, V61 and V36, the controller 122 computes the dwell times of the original vectors V6, V1, V2 and V3 in terms of dwell times of virtual vectors V12, V61 and V36 according to the above relationships for the virtual vectors, and implements pulse width modulation by original vectors V6, V1, V2 and V3 for operating the stages 100r-100t of the inverter 80. Moreover, since the original vectors V6, V1, V2 and V3 are four adjacent space vectors in this example, the number of switchings in a sampling period is six. Other possible techniques can be used for synthesizing any of the virtual vectors within a given hexagonal or triangular region, wherein the controller 122 in the examples of FIGS. 19 and 20 performs the overall space vector modulation entirely using synthesized virtual vectors. In addition, as discussed above, the controller 122 in certain examples provides the inverter switching control signals 124b to control charging and discharging of the capacitors of the individual converter stages 100, for example, to regulate the corresponding capacitor voltages to less than half of the DC bus voltage from the DC bus circuit 90 through selection among redundant output levels or states (e.g., four levels "1" or "2" in FIG. 2) in the case of a four level converter 100.

Figure 24:
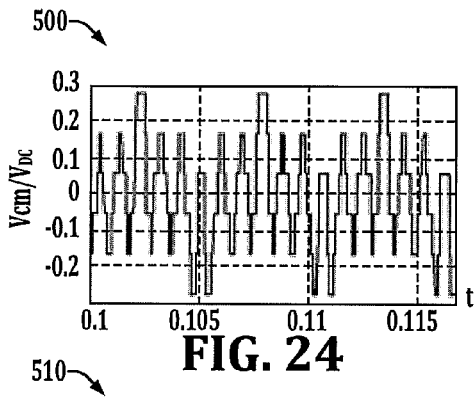
FIGS. 24-31 provide graphs illustrating exemplary simulated common mode voltage waveforms and spectrums.
Figure 25:
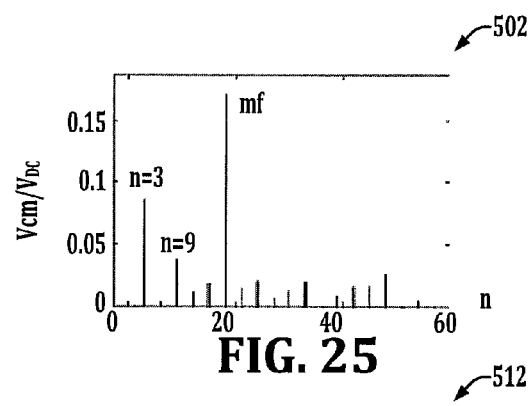
Figure 26:
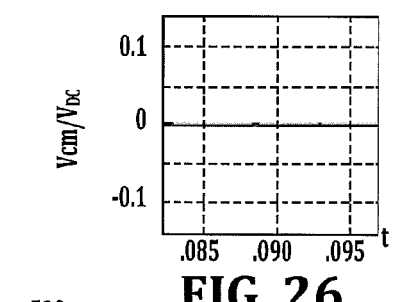
Figure 27:
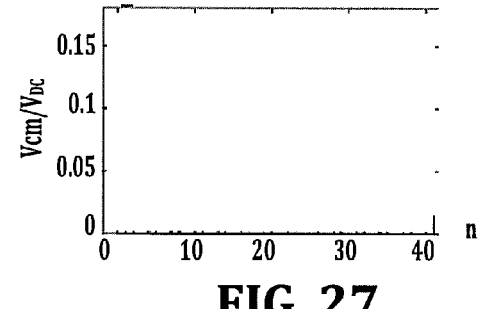
Figure 28:
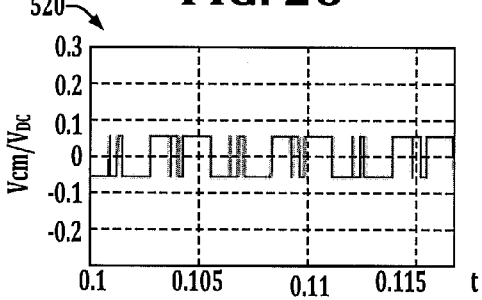
Figure 29:
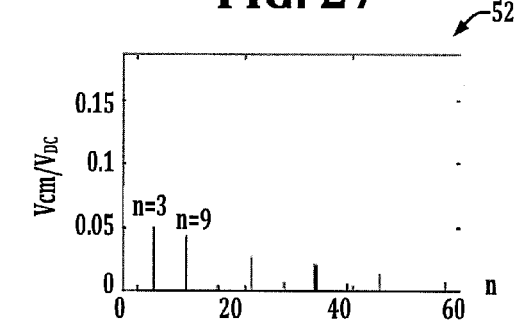
Figure 30:
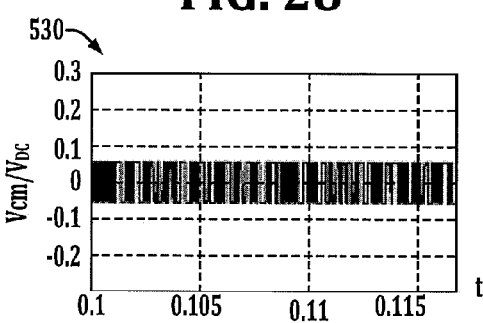
Figure 31:
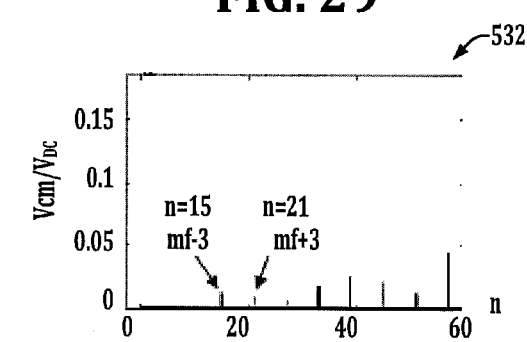

Referring also to FIGS. 24-31, the inverter space vector modulation techniques of FIGS. 13-18 and those of FIGS. 19 and 20 facilitate common mode voltage reduction in a power conversion system. For example, FIGS. 24 and 25 provide graphs 500 and 502 respectively showing common mode voltage (Vcm/VDC) and associated spectrum performance using conventional space vector modulation (e.g., using the possible switching states in the space vector modulation diagram of FIG. 6) which typically leads to common mode voltages on the order of 5Vdc/18, and the resulting spectrum of FIG. 25 includes both significant third order harmonic components and high high-order harmonic components. FIGS. 26 and 27 respectively illustrate common mode voltage and spectrum graphs 510 and 512 in which the back to back operation of the rectifier 70 and inverter 80 using the techniques described above in connection with FIGS. 9-12 provides for substantially complete cancellation or offsetting of the common mode contributions (e.g., with substantially no spectrum as shown in FIG. 27), thus reducing the common mode voltage of the system to essentially zero as shown in FIG. 26. As shown in graph 520 and 522 of FIGS. 28 and 29, use of the techniques illustrated above in connection with FIGS. 13-18 reduces the magnitude of common mode voltage to Vdc/18 (FIG. 28), thus providing approximately 80% common mode voltage reduction for operation of the inverter 80. As further seen in the common mode voltage and spectrum graphs 530 and 532 of FIGS. 30 and 31, the techniques described above in connection with FIGS. 19 and 20 reduce the common mode voltage magnitude to Vdc/18, and additionally eliminate the 3rd and 9th harmonic components, thereby facilitating filter design. Thus, the techniques of FIGS. 13-18 utilize 24 original switching states to conduct modulation, for which the common mode voltage effect is minimal (e.g., as seen in FIG. 8 above), and employ some virtual vectors formed by these original switching states to facilitate modulation, thereby resulting in reduction of the common mode voltage contribution of the inverter 80. As previously discussed, the approach of FIGS. 19 and 20 uses only virtual vectors directly to conduct modulation, with the virtual vector being constructed by original vectors, wherein the virtual vector has the advantage that the average CMV is zero. In this regard, the techniques described above in connection with FIGS. 9-20 are applicable to any four-level topology amenable to space vector modulation, wherein the approach of FIGS. 19 and 20 is extendable to other levels. Moreover, the concept of full or partial common mode voltage cancellation or offsetting described above in connection with FIGS. 9-20 can be employed in operation of any converter topology amenable to space vector modulation, including without limitation the above described NNPC architectures as well as switched capacitor multilevel converters, cascaded multilevel converters such as cascaded H Bridges (CHBs), neutral point clamped (NPC) multilevel converter stages, modular multilevel converter (MMC), NNPC stages, and the like.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
    a DC bus circuit comprising first and second DC bus terminals;
    a rectifier including a plurality of multilevel rectifier converter stages, individual ones of the multilevel rectifier converter stages comprising an AC input terminal adapted to receive AC input power from a corresponding one of a plurality of AC input phases, a pair of DC output terminals individually coupled to a corresponding one of the first and second DC bus terminals of the DC bus circuit, and a multilevel rectifier circuit operable according to a corresponding set of rectifier switching control signals to convert AC input power to provide a DC output voltage at the DC output terminals;
    an inverter including a plurality of multilevel inverter stages, individual ones of the multilevel inverter stages comprising a pair of DC input terminals individually coupled to a corresponding one of the first and second DC bus terminals of the DC bus circuit, an AC output terminal adapted to provide AC output power directly or indirectly to a corresponding one of a plurality of AC output phases to drive a load, and a multilevel inverter circuit operable according to a corresponding set of inverter switching control signals to convert DC input power from the DC bus circuit to provide an AC output voltage at the AC output terminal; and
    a controller providing the rectifier and inverter switching control signals to facilitate offsetting of common mode voltage contributions of the rectifier and the inverter;
    wherein the individual multilevel converter stages of the rectifier and of the inverter are configured to provide an integer number N AC voltage levels, where N is an even number greater than or equal to 4;
    wherein the controller provides the rectifier and inverter switching control signals via space vector modulation according to corresponding rectifier and inverter reference vectors using a corresponding subset of possible switching states with minimal absolute common mode voltages; and
    wherein the controller provides the rectifier and inverter switching control signals using the same subset of possible switching states when a modulation index associated with the rectifier reference vector is less than or equal to a predetermined value and a modulation index associated with the inverter reference vector is less than or equal to the predetermined value.

2. The power conversion system of claim 1, wherein the individual multilevel rectifier converter stages and the individual multilevel inverter stages are nested neutral point clamped multilevel converters.

3. The power conversion system of claim 2, wherein the controller provides the inverter switching control signals to the plurality of converter switching devices and to the switched capacitor circuit switching devices of the individual multilevel inverter stages to provide the output voltages at the individual AC output phases at one of four distinct levels.

4. The power conversion system of claim 2, the individual nested neutral point clamped multilevel converters comprising:
    a neutral point clamped (NPC) converter circuit including
        a plurality of converter switching devices connected in series with one another between first and second converter circuit input nodes, and a converter AC node connecting two of the plurality of converter switching devices;
    a clamping sub-circuit of the NPC converter including first and second clamping elements connected in series with one another between first and second internal nodes of the converter switching circuit, and a third internal node joining the first and second clamping elements; and a switched capacitor circuit, comprising switched capacitor circuit switching devices individually connected between a corresponding one of the converter DC terminals and a corresponding converter circuit input nodes, and first and second capacitors individually connected between a corresponding one of the converter circuit input nodes and the third internal node.

5. The power conversion system of claim 4, wherein the controller provides the rectifier and inverter switching control signals to the plurality of converter switching devices and to the switched capacitor circuit switching devices of the individual nested neutral point clamped multilevel converters to control charging and discharging of the first and second capacitors.

6. The power conversion system of claim 1, wherein the controller provides the rectifier and inverter switching control signals such that an inverter common mode contribution completely or at least partially offsets a common mode voltage contribution associated with the rectifier.

7. A power conversion system, comprising:
a DC bus circuit comprising first and second DC bus terminals;
a rectifier including a plurality of multilevel rectifier converter stages, individual ones of the multilevel rectifier converter stages comprising an AC input terminal adapted to receive AC input power from a corresponding one of a plurality of AC input phases, a pair of DC output terminals individually coupled to a corresponding one of the first and second DC bus terminals of the DC bus circuit, and a multilevel rectifier circuit operable according to a corresponding set of rectifier switching control signals to convert AC input power to provide a DC output voltage at the DC output terminals;
an inverter including a plurality of multilevel inverter stages, individual ones of the multilevel inverter stages comprising a pair of DC input terminals individually coupled to a corresponding one of the first and second DC bus terminals of the DC bus circuit, an AC output terminal adapted to provide AC output power directly or indirectly to a corresponding one of a plurality of AC output phases to drive a load, and a multilevel inverter circuit operable according to a corresponding set of inverter switching control signals to convert DC input power from the DC bus circuit to provide an AC output voltage at the AC output terminal; and
a controller providing the rectifier and inverter switching control signals to facilitate offsetting of common mode voltage contributions of the rectifier and the inverter;
wherein the individual multilevel converter stages of the rectifier and of the inverter are configured to provide an integer number N AC voltage levels, where N is an even number greater than or equal to 4;
wherein the controller provides the rectifier and inverter switching control signals via space vector modulation according to corresponding rectifier and inverter reference vectors using a corresponding subset of possible switching states with minimal absolute common mode voltages; and
wherein the controller provides the switching control signals to a first one of the rectifier and the inverter alternately using switching states of a first subset of possible switching states for which a common mode voltage contribution of the corresponding multilevel stage is a minimal positive value and a different second subset of possible switching states for which the common mode voltage contribution of the corresponding multilevel stage is a minimal negative value when a modulation index associated with the reference vector associated with the first one of the rectifier and the inverter is greater than a predetermined value and a modulation index associated with the reference vector associated with the other one of the rectifier and the inverter is less than or equal to the same predetermined value, and wherein the controller provides the switching control signals to the other one of the rectifier and the inverter using the switching states of the same subset currently used for the first one of the rectifier and the inverter.

8. The power conversion system of claim 7, wherein the individual multilevel rectifier converter stages and the individual multilevel inverter stages are nested neutral point clamped multilevel converters.

9. The power conversion system of claim 8, wherein the controller provides the inverter switching control signals to the plurality of converter switching devices and to the switched capacitor circuit switching devices of the individual multilevel inverter stages to provide the output voltages at the individual AC output phases at one of four distinct levels.

10. The power conversion system of claim 8, the individual nested neutral point clamped multilevel converters comprising:
a neutral point clamped (NPC) converter circuit including a plurality of converter switching devices connected in series with one another between first and second converter circuit input nodes, and a converter AC node connecting two of the plurality of converter switching devices;
a clamping sub-circuit of the NPC converter including first and second clamping elements connected in series with one another between first and second internal nodes of the converter switching circuit, and a third internal node joining the first and second clamping elements; and
a switched capacitor circuit, comprising switched capacitor circuit switching devices individually connected between a corresponding one of the converter DC terminals and a corresponding converter circuit input nodes, and first and second capacitors individually connected between a corresponding one of the converter circuit input nodes and the third internal node.

11. The power conversion system of claim 10, wherein the controller provides the rectifier and inverter switching control signals to the plurality of converter switching devices and to the switched capacitor circuit switching devices of the individual nested neutral point clamped multilevel converters to control charging and discharging of the first and second capacitors.

12. The power conversion system of claim 7, wherein the controller provides the rectifier and inverter switching control signals such that an inverter common mode contribution completely or at least partially offsets a common mode voltage contribution associated with the rectifier.

13. A method for operating a multiphase AC-AC conversion system having a rectifier including a plurality of multilevel rectifier converter stages, an inverter including a plurality of multilevel inverter stages, and an intermediate DC bus circuit, the method comprising:
providing rectifier and inverter switching control signals to the multilevel stages of the rectifier and the inverter via space vector modulation according to corresponding rectifier and inverter reference vectors using a corresponding subset of possible switching states with minimal absolute common mode voltages to facilitate offsetting of common mode voltage contributions of the rectifier and the inverter; and providing the rectifier and inverter switching control signals using the same subset of possible switching states when a modulation index associated with the rectifier reference vector is less than or equal to a predetermined value and a modulation index associated with the inverter reference vector is less than or equal to the predetermined value;

wherein the individual multilevel converter stages of the rectifier and of the inverter are configured to provide an integer number N AC voltage levels, where N is an even number greater than or equal to 4.

14. A method for operating a multiphase AC-AC conversion system having a rectifier including a plurality of multilevel rectifier converter stages, an inverter including a plurality of multilevel inverter stages, and an intermediate DC bus circuit, the method comprising:

providing rectifier and inverter switching control signals to the multilevel stages of the rectifier and the inverter via space vector modulation according to corresponding rectifier and inverter reference vectors using a corresponding subset of possible switching states with minimal absolute common mode voltages to facilitate offsetting of common mode voltage contributions of the rectifier and the inverter;

wherein the individual multilevel converter stages of the rectifier and of the inverter are configured to provide an integer number N AC voltage levels, where N is an even number greater than or equal to 4; and providing the switching control signals for a first one of the rectifier and the inverter alternately using switching states of a first subset of possible switching states for which a common mode voltage contribution of the corresponding multilevel stage is a minimal positive value and a different second subset of possible switching states for which the common mode voltage contribution of the corresponding multilevel stage is a minimal negative value when a modulation index associated with the reference vector associated with the first one of the rectifier and the inverter is greater than a predetermined value and a modulation index associated with the reference vector associated with the other one of the rectifier and the inverter is less than or equal to the predetermined value, and providing the switching control signals to the second one of the rectifier and the inverter using the switching states of the same subset currently used for the first one of the rectifier and the inverter.

15. A power conversion system, comprising:

a multiphase multilevel converter including a plurality of multilevel converter stages, individual ones of the multilevel converter stages comprising a pair of DC terminals individually coupled to a DC bus circuit, an AC terminal adapted to provide or receive AC output power directly or indirectly to or from a corresponding one of a plurality of AC phases, and a multilevel converter circuit operable according to a corresponding set of converter switching control signals; and a controller providing the converter switching control signals to individual ones of the multilevel converter stages via space vector modulation using only a subset of possible switching states with minimal absolute common mode voltages, wherein the controller provides the converter switching control signals by using directly only virtual vectors synthesized using actual vectors representing switching states of the subset of possible switching states according to a reference vector.

16. The power conversion system of claim 15, wherein the virtual vectors are constructed such that the average common mode voltage of the virtual vectors is zero.

17. The power conversion system of claim 15, wherein the individual multilevel converter stages are nested neutral point clamped multilevel converters having a switched capacitor circuit with first and second capacitors, and wherein the controller provides the converter switching control signals to control charging and discharging of the first and second capacitors to regulate corresponding first and second capacitor voltages to less than half of a DC bus voltage across the DC terminals.

* * * * *